United States Patent

Gottzmann et al.

[19]

[11] Patent Number: 6,139,604
[45] Date of Patent: Oct. 31, 2000

[54] THERMALLY POWERED OXYGEN/NITROGEN PLANT INCORPORATING AN OXYGEN SELECTIVE ION TRANSPORT MEMBRANE

[75] Inventors: Christian Friedrich Gottzmann, Clarence; Ravi Prasad, East Amherst; Nitin Ramesh Keskar, Grand Island; James Bragdon Wulf, Williamsville, all of N.Y.

[73] Assignee: Praxair Technology, Inc., Danbury, Conn.

[21] Appl. No.: 09/185,523

[22] Filed: Nov. 4, 1998

Related U.S. Application Data

[63] Continuation-in-part of application No. 08/972,020, Nov. 18, 1997, Pat. No. 5,954,859.

[51] Int. Cl.$^7$ ............................ B01D 53/22; B01D 53/04
[52] U.S. Cl. ................................. 95/54; 95/118; 95/139; 95/143; 95/288; 96/4; 96/108
[58] Field of Search .................... 95/39, 45, 54, 95/288, 117–119, 139, 143; 96/4, 7, 9, 11, 108, 130

[56] References Cited

U.S. PATENT DOCUMENTS

| | | | |
|---|---|---|---|
| 4,545,787 | 10/1985 | Hegarty | 55/16 |
| 5,035,726 | 7/1991 | Chen et al. | 95/54 |
| 5,035,727 | 7/1991 | Chen | 55/16 |
| 5,118,395 | 6/1992 | Chen et al. | 204/59 |
| 5,160,713 | 11/1992 | Mazanec et al. | 95/54 X |
| 5,174,866 | 12/1992 | Chen et al. | 204/59 |
| 5,205,842 | 4/1993 | Prasad | 95/54 X |
| 5,306,411 | 4/1994 | Mazanec et al. | 204/265 |
| 5,354,547 | 10/1994 | Rao et al. | 95/45 X |
| 5,435,836 | 7/1995 | Anand et al. | 95/45 |
| 5,447,555 | 9/1995 | Yee et al. | 95/54 |
| 5,516,359 | 5/1996 | Kang et al. | 95/14 |
| 5,547,494 | 8/1996 | Prasad et al. | 95/54 |
| 5,562,754 | 10/1996 | Kang et al. | 95/54 |
| 5,565,017 | 10/1996 | Kang et al. | 95/14 |
| 5,584,194 | 12/1996 | Gardner | 95/54 X |
| 5,611,842 | 3/1997 | Friesen et al. | 95/45 X |
| 5,657,624 | 8/1997 | Kang et al. | 60/39.02 |
| 5,733,435 | 3/1998 | Prasad et al. | 95/54 X |
| 5,753,007 | 5/1998 | Russek et al. | 95/41 |
| 5,820,654 | 10/1998 | Gottzmann et al. | 95/54 |
| 5,820,655 | 10/1998 | Gottzmann et al. | 95/54 |
| 5,852,925 | 12/1998 | Prasad et al. | 60/39.02 |
| 5,935,298 | 8/1999 | Prasad et al. | 95/39 |
| 5,954,859 | 9/1999 | Keskar et al. | 95/54 |

FOREIGN PATENT DOCUMENTS

| | | | |
|---|---|---|---|
| 0747108 | 12/1996 | European Pat. Off. | |
| 2257054 | 1/1963 | United Kingdom | 95/54 |

OTHER PUBLICATIONS

Suitor et al., "Development of Alternative Oxygen Production Source Using a Zirconia Solid Electrolyte Membrane", JPL Pub. D–7790 (1990).

*Primary Examiner*—Robert H. Spitzer
*Attorney, Agent, or Firm*—David M. Rosenblum

[57] ABSTRACT

A low energy cost process for the co-production of oxygen and nitrogen employing a fuel tube extending into the first oxygen selective ion transport membrane whereby fuel is introduced adjacent to the closed end and flows cocurrently with oxygen containing gas in the annulus and an oxygen selective ion transport membrane having a separator section and a reactor section. An oxygen-containing feedstock, typically air, is compressed and then contacts the cathode side of the separator section where a portion of the oxygen contained within the feedstock is transported to the anode side of the separator section and recovered as an oxygen product gas. Substantially the remainder of the oxygen contained within the feedstock is transported from the cathode side of the reactor section to the anode side and exothermically reacted with a fuel. Following the exothermic reaction, hot nitrogen rich product gas is expanded in a turbine to generate the power necessary to compress the feedstock. Expanded nitrogen rich product gas may then be recovered from the turbine exhaust.

21 Claims, 8 Drawing Sheets

THERMALLY POWERED OXYGEN/NITROGEN PLANT INCORPORATING AN OXYGEN SELECTIVE ION TRANSPORT MEMBRANE

CROSS REFERENCE TO RELATED APPLICATION

This patent application is a continuation in part of U.S. patent application Ser. No. 08/972,020, entitled Solid Electrolyte Ionic Conductor Oxygen Production with Power Generation by Keskar et al. that was filed on Nov. 18, 1997 and is incorporated by reference in its entirety herein now U.S. Pat. No. 5,954,859.

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

The invention relates to the use of solid electrolyte ionic conductor systems in gas separating systems and, in particular, to employing combustion products from an integrated ion transport membrane reactor and/or steam to purge the permeate side of solid electrolyte ionic conducting membranes to enhance the efficiency of the process and produce an oxygen, carbon dioxide and steam gas stream which can be readily separated to obtain a pure oxygen product while simultaneously producing nitrogen at elevated pressure and generating power sufficient to drive the air compressor for the system.

BACKGROUND OF THE INVENTION

The well-known Rankine vapor power cycle or its modifications (for example, reheat and regenerative cycles, dual pressure cycle, and cogeneration cycles) are currently used to produce electrical power. In these systems, steam is generally the working fluid of choice because of its easy availability, chemical stability, and relatively low cost. During the cycle, heat is added to the system to generate steam at high pressure which in turn is expanded through a turbine to generate power.

Gas turbine power cycles are analogous to vapor power cycles in that the individual processes are steady flow processes carried out in separate components. The working fluid in a gas turbine power cycle, however, is generally air or the products of combustion of fuel and air. Air is a mixture of gases which may contain varying amounts of water vapor and, at sea level, has the following approximate composition by volume: oxygen (20.9%), nitrogen (78%), argon (0.94%), with the balance consisting of other trace gases. If a fuel is used in such a system, heat is generated within the system by the fuel being combusted in a compressed air stream, and the resultant combustion products gas stream is expanded through a gas turbine to produce power.

The metallurgical temperature limit on the gas turbine blades necessitates a gas turbine operation with a very high air-to-fuel ratio. In a conventional gas turbine system, the nitrogen in the feed air and the excess oxygen present in the combustion products gas stream act as heat sinks and thereby lower the temperature of the combustion products gas stream. As a result, the exhaust gas stream from the gas turbine power cycle contains excess oxygen in which additional fuel could be burnt. These hot exhaust gases could also be used to preheat the compressed feed air or may be used to generate steam that can be employed in a vapor power cycle. The latter combined power plant is generally referred to as a COGAS plant.

It is also possible to recover some or most of the oxygen not used to support combustion from a gas turbine cycle using ion transport membrane technology. Most oxygen generating systems utilize cryogenic gas separation methods (high purity, large scale) or membrane and adsorptive separation techniques (90–95% purity, small-medium scale). Conventional non-cryogenic bulk oxygen separation systems, for example, organic polymer membrane systems, are typically very power intensive, and are usually suitable only for the production of small quantities of oxygen-enriched air (for example, 50% oxygen). Although some of these conventional processes recover a part of the power utilized in producing the product, they do not produce any net power. In addition, conventional oxygen separation processes operate at low temperatures (less than 100° C.), and do not benefit significantly from integration with a power generation process.

An entirely different type of membrane, however, can be made from certain inorganic oxides. These solid electrolyte membranes are made from inorganic oxides, typified by calcium- or yttrium-stabilized zirconium and analogous oxides having a fluorite or perovskite structure. Although the potential for these oxide ceramic materials as gas separation membranes is great, there are certain problems in their use. One of the larger problems is that all of the known oxide ceramic materials exhibit appreciable oxygen ion conductivity only at elevated temperatures. They usually must be operated well above 700° F. (370° C.), generally in the 800° F. to 1850° F. (425–1000° C.) range. This limitation remains despite much research to find materials that work well at lower temperatures. Solid electrolyte ionic conductor technology is described in more detail in Prasad et al., U.S. Pat. No. 5,547,494, entitled Staged Electrolyte Membrane, and U.S. Pat. No. 5,733,435, entitled Pressure Driven Solid Electrolyte Membrane Gas Separation Method, which are both hereby incorporated by reference to more fully describe the state of the art. The elevated temperatures of operation, however, make ion transport processes well suited for integration with high temperature processes such as vapor-based, gas-based, or combined power cycles.

Hegarty, U.S. Pat. No. 4,545,787, entitled Process for Producing By-Product Oxygen from Turbine Power Generation, relates to a process for generating net power using a combustion turbine, accompanied by the recovery of by-product oxygen-enriched gas. Air is compressed and heated, at least a portion of the air is combusted and a portion of the oxygen is removed from the air or combustion effluent using an air separator. The oxygen lean combustion effluent is expanded through a turbine to produce power. In an alternative embodiment, the effluent from the turbine is used to produce steam to generate additional power. In this process, the type of fuel is generally limited to "clean" fuels such as natural gas, oils, or synthesis gas.

Chen, U.S. Pat. No. 5,035,727, entitled Oxygen Extraction from Externally Fired Gas Turbines, relates to a process for recovering high purity oxygen from an externally fired power generating gas turbine cycle. While this process is similar to Hegarty (described above), Chen differs in the use of an externally fired gas turbine so that other types of fuels such as coal or biomass may be used.

Chen et al., U.S. Pat. No. 5,174,866, entitled Oxygen Recovery from Turbine Exhaust Using Solid Electrolyte Membrane, and Chen et al., U.S. Pat. No. 5,118,395, entitled Oxygen Recovery from Turbine Exhaust Using Solid Electrolyte Membrane, both relate to processes for extracting high purity oxygen from gas turbine exhaust streams by passing the gas turbine exhaust over an oxygen ion conducting membrane. In these processes, the oxygen separator employing an oxygen ion conducting membrane is placed downstream of some or all stages of the gas turbine, instead of upstream as in earlier patents. An electrically-driven ion transport unit is proposed when the turbine exhaust pressure is low. The exhaust stream from the oxygen separator is optionally expanded through an additional gas turbine stage.

Kang et al., U.S. Pat. No. 5,562,754, entitled Integrated High Temperature Method for Oxygen Production describes oxygen production by an ion transport membrane where the ion transport separator is located between two independently controlled direct, i.e. involving combustion, or indirect heating units. The permeate side of the ion transport membrane may be swept with steam. A stream of oxygen-containing gas preferably is heated in a direct-fired combustor, passed through the retentate zone of the ion transport membrane, and then directed to a gas turbine to generate power. This non-permeate stream is then discarded as exhaust.

Kang et al., U.S. Pat. No. 5,565,017, entitled High Temperature Oxygen Production with Steam and Power Generation, relates to a system integrating an ion transport membrane with a gas turbine to recover energy from the retentate gas stream after it is heated and steam is added. Water is added to the retentate gas stream from the ion transport module prior to the gas turbine to increase the mass flow in the turbine. This permits the ion transport module and the gas turbine to each operate at its optimum temperature.

Kang et al., U.S. Pat. No. 5,516,359, entitled Integrated High Temperature Method for Oxygen Production, describes compression and heating of feed air in a first heating step (using heat exchanger and combustor) before passing the heated, compressed air through an oxygen separator employing a mixed conducting oxide. The retentate gas stream from the ion transport module is heated in a second heating step before expanding it through a gas turbine to recover power. The hot exhaust gases from the gas turbine are used to produce steam that is expanded through a gas turbine to generate additional power. In these processes, the operating temperatures of the ion transport module and the gas turbine are independently maintained by controlling the rate of heat addition in the first and second heating steps.

Russek et al., U.S. Pat. No. 5,753,007, entitled Oxygen Production by Ion Transport Membranes with Non-Permeate Work Recovery, describes an integrated system for the recovery of oxygen and useful work. Hot non-permeate gas is recovered from the cathode side of an ion selective oxygen transport membrane. The non-permeate gas is cooled to near ambient temperature in a heat exchanger and expanded to a lower pressure generating shaft power which can be put to use, for example, to drive pneumatic tools.

None of the referenced patents have addressed co-production of nitrogen, the integration of ion transport membranes into Rankine power cycles and/or contemplate purging the permeate side of the ion transport membrane with combustion products and or steam, or elevated pressure steam and recovering oxygen and nitrogen at elevated pressure as taught by co-filed application entitled Solid Electrolyte Ionic Conductor Oxygen Production with Steam Purge, U.S. Ser. No. 08/972,410 by Prasad et al. now U.S. Pat. No. 5,935,298. The prior art has taught that ion transport membranes can be used to recover part of the oxygen not required for combustion from the compressed air stream in gas turbine cycles, however, this is accomplished at the expense of compressing additional feed air to replace the oxygen removed together with the capital costs associated with the oxygen removal system.

OBJECTS OF THE INVENTION

It is therefore an object of the invention to enable the efficient recovery of oxygen from an air feed stream that is part of a power cycle process.

It is a further object of the invention to enable use of a steam-purged ion transport module to produce a crude nitrogen stream as the retentate from which the residual oxygen is subsequently removed in a reactively purged ion transport separator to produce a high purity nitrogen co-product stream as desired.

Yet another object of the invention is to enable recovery of oxygen at an elevated intermediate pressure using the instant process without the need for an oxygen compressor by providing the steam purge stream at a high pressure and condensing out the water while at an intermediate elevated pressure after expansion in a steam turbine.

It is another object of the invention to maximize power production by a Rankine cycle and improve energy utilization by inserting one or more high pressure steam expansion stages upstream of the ion transport separator purge inlet.

It is a further object of the invention to enable simplification of the system, while producing co-product nitrogen at elevated pressure, by expanding in a turbine a portion of the retentate stream proportioned to generate sufficient power to drive the feed air compressor.

It is a further object of the invention to enable efficient recovery of product oxygen and high pressure nitrogen by a thermally driven free standing air separation plant.

It is another object of the invention to enable the use of a low cost turbine by cooling the turbine feed prior to expansion to an intermediate temperature low enough to permit use of lower cost engineering materials such as stainless steel, yet high enough to retain adequate work performing potential for powering the air compressor with only a portion of the retentate stream to permit recovery of a portion of the retentate as nitrogen at pressure.

It is another object of the invention to enable the use of compact low cost turbomachinery by integrating the turbine with a multistage air compressor in a single assembly.

It is a further object of the invention to employ a pressure and optionally also temperature swing adsorption prepurifier which is regenerated by turbine exhaust gas to remove $CO_2$, water and many other impurities from the air feed to enable the production of high purity nitrogen.

SUMMARY OF THE INVENTION

The invention comprises a process for producing an oxygen-depleted gas stream and a high-pressure gas stream containing oxygen and steam from a feed gas stream containing elemental oxygen. The feed gas stream is compressed and heated, and the heated feed gas stream is separated using at least a first ion transport module including an ion transport membrane into the oxygen-depleted gas stream on a retentate side and an oxygen-containing gas stream on a permeate side of the ion transport membrane. The permeate side is purged using a high-pressure purge gas stream containing steam to produce the high-pressure gas stream containing oxygen and the purge gas. The exiting high-pressure permeate gas stream containing oxygen and steam is expanded in a turbine to recover power and produce a lower pressure gas stream containing oxygen and steam. Preferably, the expanded lower-pressure gas stream containing oxygen and steam is separated into an oxygen gas stream by condensing out the water in a water- or air-cooled condenser.

In a preferred embodiment of the invention, the heat contained in the retentate stream is recovered in a recuperative heat exchanger to preheat the incoming air. The high-pressure purge gas stream is directed through a second turbine and is superheated sufficiently to avoid condensation during expansion in the second turbine. The high temperature retentate stream preferably is expanded in an additional turbine with or without additional heat addition.

In another preferred embodiment the retentate stream from the steam purged ion transport membrane is further processed in a deoxo stage, consisting of a reactively purged ion transport membrane, to produce a high purity nitrogen co-product stream.

In another preferred embodiment of the invention the permeate side of the oxygen separator section is purged by the permeate stream exiting the Deoxo reactor section and optionally also by low or medium pressure steam generated by recuperative recovery of heat from the gas turbine exhaust stream, thereby producing a low to medium pressure product stream consisting of oxygen, steam and $CO_2$. Low purity oxygen, with primarily $CO_2$ as an impurity, can be recovered by condensing out steam. Optionally a downstream system can separate this stream into oxygen and an optional $CO_2$ by-product.

In another preferred embodiment of the invention the nitrogen retentate stream exiting the deoxo reactor is cooled to an intermediate temperature (1200° to 1400° F.), sufficiently low to permit use of standard materials of construction in the turbine, such as 17-4 Ph Stainless Steel, yet high enough to retain sufficient energy potential to power the air compressor while using only a portion of the retentate stream thereby permitting recovery of the remainder of the stream as nitrogen product at an elevated pressure. In a preferred embodiment all the energy required to operate the separation system is provided by the heat generated by the oxygen-fuel reaction in the Deoxo reactor.

In a preferred embodiment an optional pressure and temperature swing prepurifier is installed in the air feed line to remove water, $CO_2$ and other impurities from the stream thereby permitting recovery of high purity nitrogen. In a preferred embodiment the beds of the prepurifier are regenerated by exhaust gas from the expansion turbine.

In a preferred embodiment the oxygen transport membrane (OTM) separator and the Deoxo reactor are combined with appropriate preheat and cooling sections in a single apparatus, thereby placing major structural elements, such as tube sheets and shells into moderate temperature environment to permit use of standard engineering materials, such as stainless steel or carbon steel, and ease making the tube to tube sheet joints. In the preferred arrangement all tubes have one end free floating to avoid stresses from thermal and compositional dimensional changes.

BRIEF DESCRIPTION OF THE DRAWINGS

Other objects, features and advantages of the invention will occur to those skilled in the art from the following description of preferred embodiments of the invention and the accompanying drawings, in which.

DETAILED DESCRIPTION OF THE INVENTION

Figure 1:
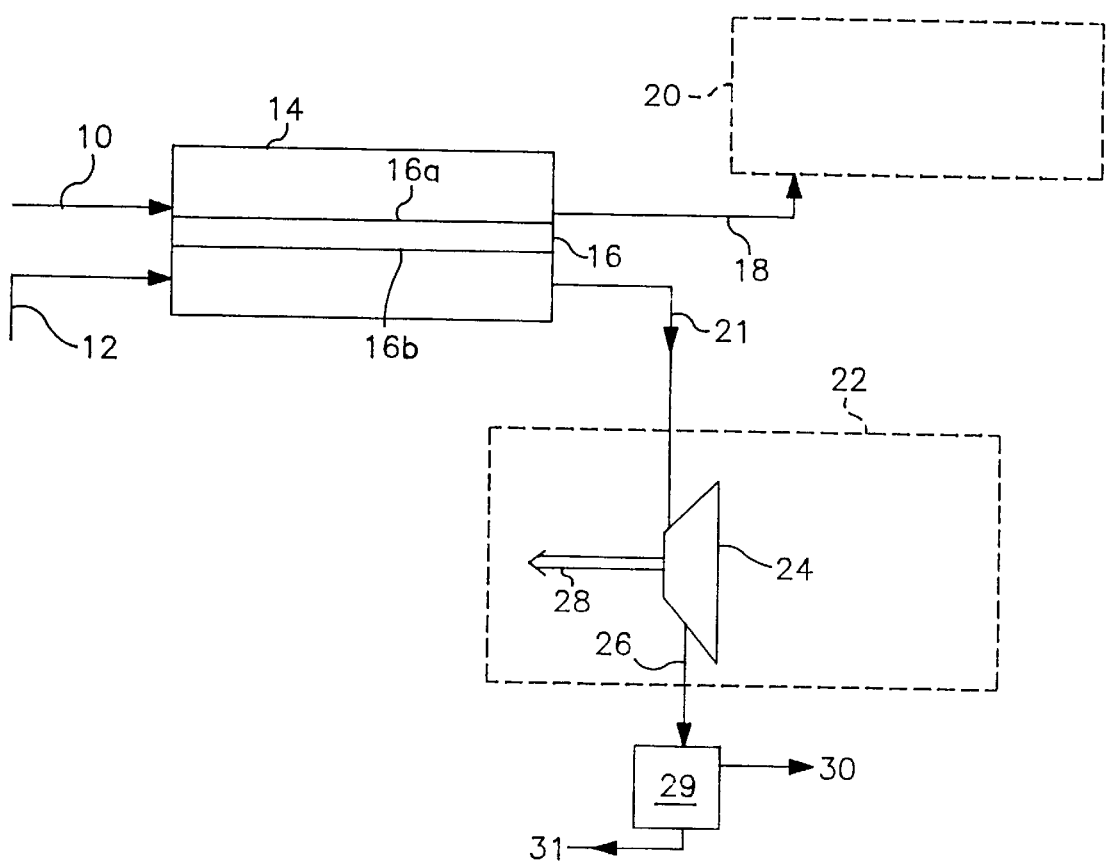
FIG. 1 is a schematic diagram of the invention separating oxygen from air using a steam-purged solid electrolyte ionic conductor module in combination with a heat recovery section and a steam turbine downstream of the ion transport module.

The essence of the invention is to install an ion transport oxygen separator in a steam-based or a combined-cycle power generation configuration, such that the permeate side of the ion transport membrane is purged with high pressure steam. Such a steam purge enhances oxygen transport across the ion transport membrane and oxygen recovery from the feed gas stream, which typically is air. After the permeate gas stream containing steam and oxygen is expanded in a steam turbine and finally cooled, water condenses out of the gas stream and an oxygen gas stream, saturated with water vapor but otherwise pure, is obtained. In another part of the configuration, the retentate gas stream which has been partially depleted of oxygen in the ion transport module, may be combusted or externally heated using a fuel, and expanded in a gas turbine to produce more power. The exhaust from the gas turbine is generally hot enough to be utilized to assist in the generation of steam that will be utilized in the steam-based power generation part of the process or can be used in preheating the air feed to the separator.

This novel method produces oxygen at a very low incremental power cost, which is attractive compared to other methods of oxygen production. The gases from which oxygen needs to be separated can be made available at relatively high temperature (greater than 400° C.), whereas current commercial oxygen production processes typically operate at temperatures below 100° C. Because of this limitation, conventional oxygen separation methods do not gain significant efficiencies by integration with a power generation process. Thus, it appears that novel gas separation processes employing oxygen ion conductors have the promise of highly synergistic integration with power generation processes which can dramatically lower the cost of oxygen.

The present invention enables the integration of steam pureed ion transport membranes for the separation of oxygen from air with Rankine steam, Brayton gas, and combined Brayton and Rankine steam power cycles. The key advantages of the processes proposed here are as follows:

The present invention uses steam at elevated pressure as a purge gas, thereby reducing the effective partial pressure of oxygen on the purge-side. This enhances the driving force across the ion transport membrane, and effects a higher oxygen flux and a lower membrane area requirement. In practice it also makes possible higher recovery of oxygen contained in the air and permits, if so desired, recovery of oxygen at an elevated pressure, or expansion of the purge stream and recovery of power. Alternately, the stream can be expanded to an intermediate pressure and oxygen recovered at that intermediate pressure. Purging at an elevated pressure also reduces or eliminates the pressure differential across the ion transport membrane and eases structural design and sealing.

By changing the amount of steam used for purging, the amount of oxygen recovered can be varied. In fact, as mentioned earlier most of the oxygen in the feed gas can be recovered. Also the membrane area may be reduced.

Adaptation to gas turbine cycles is easy since the operating temperatures of ion transport separator and gas turbine can be uncoupled and a typical gas turbine processes a significant amount of excess air. Therefore the fraction of oxygen removed from the turbine air is a small portion of the total flow.

Oxygen produced in the configuration is diluted with steam, making it easier and safer to handle. By withdrawing the steam and oxygen gas stream from the steam turbine exhaust at an intermediate pressure and condensing the steam, it is possible to obtain oxygen gas at a higher intermediate pressure albeit at the expense of reduced power generation. By-product nitrogen can be produced by deployment of a deoxo reactor in combination with or without employment of externally fired heaters. The co-production of power can be raised and optimized by suitably integrating a high pressure stage steam turbine upstream of the ion transport module.

Several embodiments incorporating an ion transport membrane into a gas turbine system, including retrofit of a turbine power generation system, are disclosed in Prasad et al., U.S. Ser. No. 08/933,248, filed Sep. 18, 1997, now U.S. Pat. No. 5,852,925, which is a divisional of U.S. Ser. No. 08/490,362, filed Jun. 14, 1995, now abandoned, both of which are incorporated herein by reference.

The ion transport membrane employed in the oxygen separator discussed herein is a solid electrolyte ionic conductor. Ion transport materials that transport oxygen ions are deemed useful for the separation of oxygen from gas mixtures. Certain ion transport materials are mixed conductors, conducting both oxygen ions and electrons. At elevated temperatures, these materials contain mobile oxygen ion vacancies that provide conduction sites for selective transport of oxygen ions through the material. The transport is driven by the partial pressure ratio of oxygen across the membrane: oxygen ions flow from the side with high oxygen partial pressure to that with low oxygen partial pressure. Ionization of oxygen to oxygen ions takes place on the cathode or retentate side of the membrane, and the ions are then transported across the ion transport membrane. The oxygen ions deionize on the permeate side of the membrane, releasing oxygen molecules. For materials that exhibit only ionic conductivity, external electrodes are placed on the surfaces of the electrolyte and the electronic current is carried in an external circuit. In mixed conducting materials electrons are transported to the cathode internally, thus completing the circuit and obviating the need for external electrodes. Dual phase conductors, in which an oxygen-ion conductor is mixed with an electronic conductor, may also be used for the same applications.

Table I is a partial list of ion transport materials of interest for oxygen separation.

| Material composition |
| --- |
| 1. $(La_{1-x}Sr_x)(Co_{1-y}Fe_y) O_{3-\delta}$ ($0 \leq x \leq 1$, $0 \leq y \leq 1$, $\delta$ from stoichimetry) |
| 2. $SrMnO_{3-\delta}$ |
|     $SrMn_{1-x}CO_xO_{3-\delta}$ ($0 \leq x \leq 1$, $\delta$ from stoichimetry) |
|     $Sr_{1-x}Na_xMnO_{3-\delta}$ |
| 3. $BaFe_{0.5}Co_{0.5}YO_3$ |
|     $SrCeO_3$ |
|     $YBa_2Cu_3O_{2-\beta}$ ($0 \leq \beta \leq 1$, $\beta$ from stoichimetry) |
| 4. $La_{0.2}Ba_{0.8}Co_{0.8}Fe_{0.2}O_{2.6}$; $Pr_{0.2}Ba_{0.8}Co_{0.8}Fe_{0.2}O_{2.6}$ |
| 5. $A_xA'_{x'}A''_{x''}B_yB'_{y'}B''_{y''}O_{3-z}$ (x, x', x", y, y', y" all in 0–1 range) |
|     where: A, A', A" = from groups 1, 2, 3 and f-block lanthanides |
|             B, B', B" = from d-block transition metals $\geq$ from stoichimetry |
| 6. (a) Co—La—Bi type:    Cobalt oxide    15–75 mole % |
|                                   Lanthanum oxide   13–45 mole % |
|                                   Bismuth oxide     17–50 mole % |
|    (b) Co—Sr—Ce type:    Cobalt oxide    15–40 mole % |
|                                   Strontium oxide   40–55 mole % |
|                                   Cerium oxide     15–40 mole % |
|    (c) Co—Sr—Bi type:    Cobalt oxide    10–40 mole % |
|                                   Strontium oxide    5–50 mole % |
|                                   Bismuth oxide     35–70 mole % |
|    (d) Co—La—Ce type:    Cobalt oxide    10–40 mole % |
|                                   Lanthanum oxide   10–40 mole % |
|                                   Cerium oxide     30–70 mole % |
|    (e) Co—La—Sr—Bi type:    Cobalt oxide    15–70 mole % |
|                                   Lanthanum oxide    1–40 mole % |

-continued

| | Material composition | |
|---|---|---|
| (f) Co—La—Sr—Ce type: | Strontium oxide | 1–40 mole % |
| | Bismuth oxide | 25–50 mole % |
| | Cobalt oxide | 10–40 mole % |
| | Lanthanum oxide | 1–35 mole % |
| | Strontium oxide | 1–35 mole % |
| | Cerium oxide | 0–70 mole % |

7. $Bi_{2-x-y}M'_xM_yO_{3-\delta}$ ($0 \leq x \leq 1$ $0 \leq y \leq 1$, $\delta$ from stoichimetry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where,
   x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and
   $0.9 < (s+t)/(u+v+w) < 1.1$
10. One of the materials of $La_{1-x}Sr_xCu_{1-y}M_yO_{3-\delta}$ family, where:
    M represents Fe or Co;
    x equals from zero to about 1;
    y equals from zero to about 1;
    3 equals a number that satisfies the valences of La, Sr, Cu, and M in the formula.
11. One of the materials of $Ce_{1-x}A_xO_{2-\delta}$ family, where:
    A represents a lanthanide, Ru, or Y; or a mixture thereof;
    x equals from zero to about 1;
    $\delta$ equals a number that satisfies the valences of Ce and A in the formula.
12. One of the materials of $Sr_{1-x}Bi_xFeO_{3-\delta}$ family, where:
    A represents a lanthanide or Y, or a mixture thereof;
    x equals from zero to about 1;
    $\delta$ equals a number that satisfies the valences of Sr, Bi and Fe in the formula.
13. One of the materials of $Sr_xFe_yCo_2O_w$ family, where:
    x equals from zero to about 1;
    y equals from zero to about 1;
    z equals from zero to about 1;
    w equals a number that satisfies the valences of Sr, Fe and Co in the formula.
14. Dual phase mixed conductors (electronic/ionic):
    $(Pd)_{0.5}/(YSZ)_{0.5}$
    $(Pt)_{0.5}/(YSZ)_{0.5}$
    $B—MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added YSZ is yttrium stabilized zirconia It is relatively easy to use the basic ion transport separation process to remove nearly all of the oxygen from the feed gas stream to produce a nitrogen product gas stream, particularly if the permeate side of the ion transport membrane can be purged with an oxygen-free stream. It is, however, more difficult to efficiently recover oxygen as the product using this basic process. For example, if pure oxygen is withdrawn as the permeate gas stream at atmospheric pressure, the amount of oxygen that can be recovered is limited by the partial oxygen pressure of the exiting retentate. Therefore, the feed air stream must be at a pressure well in excess of 5 atm. At this level oxygen partial pressures are equal at the anode and cathode and oxygen recovery zero. If a steam purge is used a positive driving force can be maintained for oxygen transfer at 5 atm or even lower air pressure. A usually impractical alternate process would involve vacuum pumping of the permeate side of the ion transport membrane in order to maintain the driving force for the permeation process without contaminating the oxygen product gas stream.

Processes according to the present invention use a pressurized superheated steam from a Rankine cycle system to purge the permeate side of the ion transport membrane. With an adequate flow of steam, the partial pressure of oxygen in the permeate gas stream can be reduced to a low value, thus permitting oxygen permeation to occur when the feed gas stream is at a lower pressure. By cooling the permeate gas stream, the water therein can be condensed and recycled, leaving the residual oxygen to be recovered. This cooled oxygen gas stream will contain some residual water vapor but is otherwise pure. It can be used directly as the product, or it can be dried further, for example, in a polymeric membrane or pressure or temperature swing adsorption (PSA) postpurifier. The oxygen product gas stream will be at the saturation pressure of the condensing steam, which can be adjusted to be at a low or intermediate level, depending on the optimization of product and power needs. Nitrogen can also be obtained as the product or coproduct at a moderate or high pressure level.

Since generating steam is energy intensive especially with respect to the heat of vaporization it is advantageous to use the steam to generate power for driving plant associated compressors and or export. Such a power cycle also has the ability to use available low level heat to reduce the energy required for raising steam. The invention permits a high degree of freedom in selecting pressure levels for the feed gas depending on whether the gas is part of a gas turbine cycle, or whether a co-product is required at a certain pressure level.

A preferred embodiment of the invention produces a high purity nitrogen co-product. In this case the steam purged ion transport membrane recovers the bulk of the oxygen contained in the feed leaving a residual amount of oxygen to be removed by a downstream deoxo in the form of a reactively purged ion transport membrane. In this case it is advantageous to control the amount of oxygen to be reacted in the deoxo at a level sufficient to provide the necessary heat to balance requirements of the gas cycle. Since the oxygen reaction takes place on permeate side, the retentate stream is not contaminated with products of combustion and a high purity nitrogen co-product can be obtained. The nitrogen will be at pressure and all or part of the stream can be expanded in a turbine to generate power depending on how much of the nitrogen product is required at pressure. There could be an advantage, with respect to system simplicity, in expanding just sufficient nitrogen to drive the air compressor leaving the remainder as an elevated pressure co-product. In case the product nitrogen can contain small residual amounts of oxygen, the deoxo can be eliminated and the steam purged ion transport membrane used to refine the feed to the permissible residual oxygen content. An externally fired heater upstream or downstream from the membrane can be used to balance the heat losses from the system. One of the advantages of the steam purged systems is that, since it provides such high recovery, it limits the need for compressing and processing a significant amount of excess air.

In another preferred embodiment of the invention a high pressure steam expansion stage is inserted upstream of the inlet to the permeate side of the ion transport membrane. For system simplicity the process conditions for this stage are selected in such a way that all or most of the superheat, required for this stage to prevent a wet turbine exhaust, can be provided by the available sensible heat in the turbine exhaust from the second low pressure steam turbine stage which is located downstream from the ion transport membrane. The advantage of this arrangement is that it can generate a significant amount of extra power at marginally increased fuel expenditure.

It should also be noted that the invention does not require the piping or handling of pure oxygen at high temperatures, which often presents serious safety hazards. Therefore, the need for special materials and procedures for handling high temperature pure oxygen is avoided and the claimed process should achieve greater safety.

As noted above, the ion transport membrane will transport oxygen when there is a difference in oxygen partial pressure across it. In comparison to polymeric membranes, ion transport membranes have a higher flux and an infinite separation factor for oxygen with respect to nitrogen. The type of ion transport module used in the invention is usually a 4-port device, similar that even though the invention optimally operates with counter-current flow of permeate and retentate in the ion transport separator it is also applicable with other flow configurations, for example, co-current and crossflow configurations.

The basic embodiment of the invention is illustrated by the schematic diagram in FIG. 1. During operation, oxygen-containing feed gas stream 10 (generally air), usually at an elevated pressure, after having been heated to ion transport operating temperature, is introduced into ion transport module 14 containing ion transport membrane 16 having a retentate side 16A and a permeate side 16B. High-pressure steam purge stream 12 purges the permeate side 16B of ion transport membrane 16 to produce retentate gas stream 18 and permeate gas stream 21. The use of purge gas stream 12 reduces the oxygen partial pressure on the permeate side 16B of ion transport membrane 16, and therefore enables efficient oxygen transport even when the retentate side 16A feed gas pressure is low. Because steam purge stream 12 mixes with and dilutes the oxygen that has permeated through ion transport membrane 16, permeate stream 21 that emerges from ion transport module 14 contains both steam and oxygen at high pressure.

Permeate gas stream 21 is directed to energy extractor section 22 where steam turbine 24 generates power 28 and discharges gas stream 26 at a lower pressure. The remaining heat energy in gas stream 26 preferably is extracted and used, for example, to superheat steam and heat boiler feed water. Following recovery of heat, stream 26 enters a condenser-separator 29 where contained water is condensed and discharged as stream 31. The uncondensed stream, comprising water vapor saturated oxygen, is withdrawn as stream 30. In addition, retentate gas stream 18 preferably is directed to heat extractor section 20 where energy is removed from retentate gas stream 18 by, for example, expansion through a gas turbine or transfer of heat to the feed stream.

Figure 2:
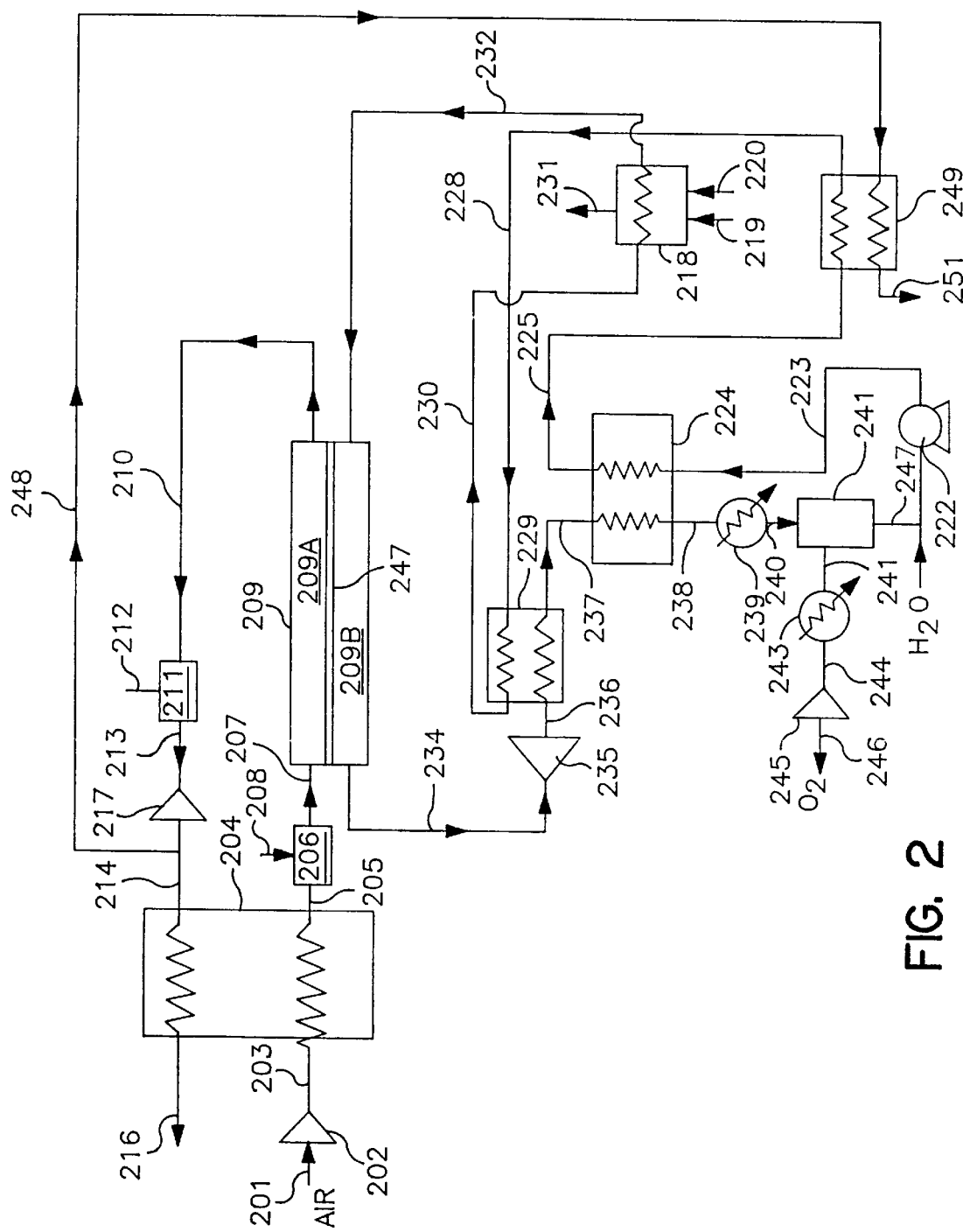
FIG. 2 is a more detailed diagram of an embodiment of the invention, showing the integration of oxygen separation by a steam-purged ion transport module with a steam Rankine cycle and a gas turbine, such that oxygen is recovered from the steam-oxygen mixture by condensing out the water which is returned to the Rankine cycle.

An embodiment of the invention is illustrated by a more detailed schematic diagram in FIG. 2 which illustrates an integration of oxygen separation by a steam purged ion transport separator and an associated steam turbine with a gas turbine cycle. Feed gas 201, usually air, is compressed by compressor 202 to a pressure between 100 and 250 psig to produce compressed air stream 203. Stream 203 is then preheated in heat exchanger 204 by waste heat contained in turbine exhaust 214. Resulting compressed and preheated air stream 205 preferably is heated further in combustor 206 to the ion transport operating temperature of 800 to 1900° F. (425–1035° C.) by combusting a portion of the contained oxygen with fuel stream 208. Heated stream 207 enters the cathode or retentate side 209A of ion transport separator 209. Here oxygen is transferred by ion transport across mixed conductor ion transport membrane 247 to the permeate side 209B of separator 209 with the driving force for the separation provided by the ratio of partial oxygen pressures across membrane 247. A significant fraction of the contained oxygen in the feed stream can be separated since typical gas turbine cycles must use excess air to limit the temperature rise in combustors to levels compatible with available materials of construction used in the turbine.

Partially oxygen depleted retentate gas 210 is optionally further heated to the permissible turbine inlet temperature in combustor 211 using fuel stream 212. Gas stream 213, now at turbine inlet temperature, is then expanded in turbine 217 producing power which drives compressor 202 and usually a generator to generate power for export. Exhaust stream 214 contains useful waste heat which preferably is used to preheat air stream 203 in heat exchanger 204. Cooled stream 216 is discharged from the cycle.

Optionally the waste heat is also utilized advantageously in the associated steam cycle. The example discussed later utilizes this option. In this embodiment at least a portion of the stream discharged from the gas turbine becomes stream 248 which provides the necessary heat for evaporating stream 225 in heat exchanger 249 which takes the place of the evaporator coil of a boiler which would be used in another option. Following heat exchange stream 248 becomes stream 251 and is discharged as a waste stream.

Processes according to the present invention purge the permeate side with high pressure superheated steam which is then expanded in a turbine to recover power. As shown in FIG. 2, high pressure superheated steam 232 is introduced to the permeate side 209B of separator 209, preferentially countercurrently to the feed stream 207. The presence of steam lowers the partial oxygen pressure on the permeate side 209B, which increases the driving force for oxygen transport, and thereby reduces the required area for ion transport membrane 247. The exiting permeate stream 234 is a mixture of steam and oxygen which is expanded in turbine 235 to recover power. The exhaust stream 236 from turbine 235 contains sensible heat which preferably is utilized to partially superheat high pressure steam 228 in heat exchanger 229. Resulting stream 237 still contains sufficient heat to warm feed water stream 223 in heat exchanger 224. In externally cooled condenser 239 the major fraction of water in stream 238 is condensed to produce a mixture of water and saturated oxygen 240 which are separated in separator 241 to produce water stream 247 and oxygen stream 242.

Optionally, oxygen stream 242 is further cooled in cooler 243 resulting in cool oxygen stream 244 which is optionally compressed in compressor 245 to produce product oxygen stream 246 at a desired delivery pressure. If required, the product oxygen can be dried using a polymeric membrane or adsorption dryer.

Water stream 247 exiting from separator 241 is joined with make-up water 221 and then pumped to the desired pressure in water pump 222 to produce pressurized feed water stream 223 which is warmed in feed water heater 224 and then, as warm water stream 225, is introduced to the evaporator heat exchanger 249 to produce saturated or slightly superheated steam 228. Steam 228 is further superheated in heat exchanger 229, recovering available heat from stream 236. The resulting superheated stream 230 is then introduced to superheating coil 231 of externally fired heater 218 to raise its temperature to the operating temperature of ion transport separator 209. The resulting superheated stream 232 is then introduced into separator 209. Combustion in externally fired heater 218 is sustained by combining fuel stream 219 and air stream 220 which finally exit as stack gas stream 231.

Some of the major advantages of the above system over an alternate system without the Rankine steam cycle are: a significant reduction in the required ion transport membrane area, the co-production of significant additional power by the steam turbine; and potential reduction and possible elimination of the total pressure difference across the membrane, to ease sealing between the retentate and permeate streams of separator 209 as well as structural design of the separator.

EXAMPLE 1

In the following the calculated performance is compared for three gas turbine cycles with oxygen co-production: The system with the invention represented by FIG. 2 (Case A); a cycle where the gas turbine waste heat is used to raise steam for purging the permeate side of the ion transport generator and oxygen is delivered at an elevated pressure (Case B), and a gas turbine cycle with oxygen co-production and no steam generation where the turbine exhaust is used to regeneratively pre-heat the air (Case C).

Process conditions:

Oxygen Co-production: 1000 MNCFH
    Air Compressor Discharge Pressure: 185 psia
    Single Stage Air Compression at Ad.Eff=85%
    Ion Transport Inlet Temperature: 1650° F. (900° C.)
    Turbine Inlet Pressure 180 psia
    Turbine Exhaust Pressure 16 psia
    Turbine Inlet Temperature 2000° F. (1090° C.)
    Turbine Efficiency=90%
    Oxygen Recovery: 5.6% of Compressed Air Stream
    Cases with Steam Purge:
    Steam Pressure: 84 psia
    Steam raised: 172 lbs/1000 NCFH $O_2$
    For Steam Turbine:
    Exhaust Pressure 16 psia
    Steam Turbine Efficiency: 90%
    Oxygen Product Pressure: 14.7 psia Cases A and C
        82 psia Case B

TABLE 2

Performance Comparison

| | Case A | Case B | Case C |
|---|---|---|---|
| Net Power KW | 75,000 | 55,500* | 53,750 |
| Heat Required MM BTU/Hr | 606 | 527 | 442 |
| Heat Rate BTU/KW Hr | 8,080 | 9490 | 8220 |
| Eff. $O_2$ Driving Force log (Po1/Po2) | .45 | .45 | .115 |

*Credit for $O_2$ Compression to 82 psia

The comparison in Table 2 clearly demonstrates the advantage of both steam purged cases over the non-purged case in terms of the available driving force for transporting $O_2$ across the ion transport membrane. Since these values are proportional to ion transport area substantially more area will be required for the non purged gas turbine cycle. Case A, representing a process according to the invention, shows also a small advantage in energy utilization over Case C and a very significant advantage over Case B.

Figure 3:
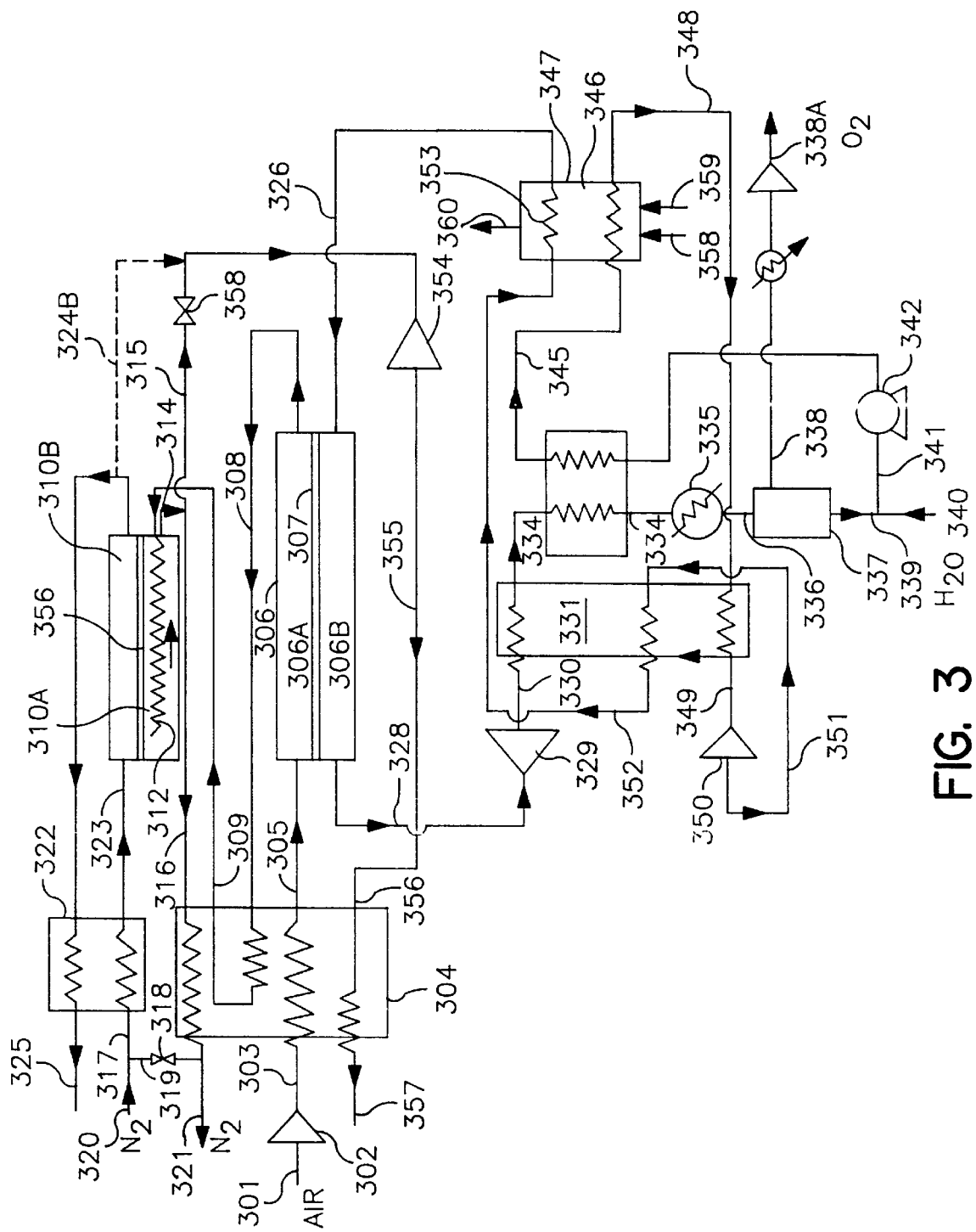
FIG. 3 is a schematic diagram of an embodiment of the invention similar to FIG. 2 illustrating a deoxo unit integrated into the process to produce a high purity co-product nitrogen stream, and a more efficient two-stage Rankine cycle can be integrated into the system to maximize the production of by-product power while producing both oxygen and nitrogen.

A preferred embodiment of the invention, which incorporates additional inventive features, is illustrated in FIG. 3. This embodiment features the coproduction of nitrogen and the generation of additional power at minimal incremental fuel expenditure by addition of a high pressure steam turbine stage.

Air 301 is compressed to a suitable pressure, such as between 100 and 300 psia by compressor 302 to produce compressed air stream 303. Compressed air stream 303 is heated to ion transport operating temperature (typically between 700 and 1800° F.) in heat exchanger 304 by heat sources such as available heat from various waste and product streams as well as heat generated in ion transport reactor 310. Heated and compressed air 305 is introduced into the retentate side 306A of ion transport separator 306. Here oxygen is transferred across mixed conductor membrane 307 by ion transport driven by the ratio of partial oxygen pressures across membrane 307.

The permeate side 306B of separator 306 is purged by high pressure superheated steam. The dilution of the permeate gas with steam effectively reduces the partial oxygen pressure on the permeate side and therefore increases the driving force for oxygen transport. In an application that stresses the production of nitrogen and oxygen, the present invention enables maximization of the recovery of oxygen at minimum air flow since recovery is not limited by the exiting partial oxygen pressure of the retentate as in the nonpurged case.

When co-production of nitrogen is desired, separator 306 removes the major portion of the contained oxygen from the feed stream. Since in this embodiment the residual oxygen is the oxidant for the reaction which provides the necessary heat for sustaining system operation, the residual amount of oxygen left in retentate stream 308 is a function of the heat demands of the system which in turn depends on the portion of retentate gas that is expanded in a turbine.

Stream 308 is cooled in heat exchanger 304 against the feed stream 303 to a level which permits it to absorb the heat of reaction generated in ion transport reactor without exceeding the permissible maximum temperature of 900 to 1850° F. Partially cooled stream 309 enters the retentate side 310A of ion transport reactor 310. In this unit the residual oxygen in stream 309 is transported across membrane 356 and reacted with fuel in permeate stream 323 on the permeate side 310B of reactor 310. The reaction on the permeate side provides a very low oxygen partial pressure for efficient oxygen transport down to very low oxygen content of the retentate gas thereby producing a very high purity nitrogen stream 324.

The heat of reaction is absorbed as by the temperature rise of the retentate gas with internal reactor heat transfer element 312 assuring that local membrane temperatures do not exceed permissible levels. A suitable design of reactor internal elements is discussed in co-pending application entitled Solid Electrolyte Ionic Conductor Reactor Design, U.S. Pat. No. 5,820,655 by Gottzmann et al., which is hereby incorporated as a reference.

In one embodiment, all of the high pressure hot nitrogen gas 314 is recovered as high pressure product; in another embodiment, some or all of it can be expanded in a hot gas expander 354 to generate power. The resulting stream 355 is cooled in heat exchanger 304 to deliver the nitrogen product 357 at low pressure. From the point of view of system simplicity it may be advantageous to split stream 314 into two streams one of which, stream 315, is expanded in hot gas expansion turbine 354 to generate sufficient power to drive air compressor 302. Under most circumstances this leaves sufficient nitrogen 316 to be delivered as a high pressure product 321 after recovery of waste heat in heat exchanger 304. Heat exchanger 304 is shown as one unit for the sake of simplicity but could optionally be divided into several exchangers to perform all the required heat transfer functions.

A portion of product stream 321 (preferably 5 to 15%) may be throttled down by valve 318 to a lower pressure stream 319 and mixed with fuel stream 320 as a diluent to produce stream 317. Stream 317 is heated in heat exchanger 322 against permeate waste stream 324 and introduced to the permeate side of ion transport reactor 310 as stream 323 where the fuel contained in the stream reacts with the oxygen permeating across membrane 356. Hot permeate waste stream 324 is discharged as stream 325 after recovery of waste heat in exchanger 322.

Alternatively, at least a portion of the permeate discharge from the ion transport reactor can become stream 324B, shown in phantom, which joins stream 315 prior to expansion through turbine 354. In this case the reactive purge stream is at or near retentate pressure and throttling valve 318 is now a proportioning valve. Valve 358, also shown in phantom, may be inserted to adjust the pressure of stream 315 to that of stream 324B. The alternate arrangement increases the amount of nitrogen recovered at pressure, at the expense of contaminating the low pressure nitrogen with products of combustion, since expansion of the permeate stream can be substituted for that of some of the high pressure nitrogen.

As in FIG. 2, the permeate side 306B of ion transport separator 306 is purged with high pressure superheated steam 326 preferably at a pressure of at least 50 psia, more preferably at least 150 psia. The steam circuit is similar to that of FIG. 2 except that a high pressure steam turbine stage has been inserted upstream of separator 306. The details of the steam circuit are as follows: Feed water 341 is pumped to an elevated pressure (typically 300 to 1200 psig) by pump 342 then heated as stream 343 in feed water heater 333 against available waste heat and introduced to the evaporator section 346 of boiler 347. High pressure steam 348, at or near saturation temperature, is superheated in heat exchanger 331 to a sufficiently high temperature to avoid condensation during expansion as stream 349 in steam turbine 350 to an intermediate pressure level. It is advantageous to select operating conditions for the steam turbines in such a fashion that all or most of the superheat for stream 349 can be provided by the available sensible heat from the exhaust 330 of the low pressure stage 329. The discharge 351 from turbine 350, now near saturation temperature at an intermediate pressure, is partially superheated by transfer of residual available waste heat in exchanger 331, which is shown as a single exchanger but could consist of two separate units, and then as stream 352 is further superheated in superheating coil 353 of boiler 347 to produce superheated steam 326 at ion transport operating temperature.

Stream 326 is introduced to the permeate side 306B of separator 306 where it picks up oxygen transferred from the retentate side 306A of separator 306. The steam-oxygen mixture 328 is expanded in the low pressure stage turbine 329 to produce power. Since the discharge 330 from this turbine is still at a substantially elevated temperature the sensible heat of stream 330 is recovered in heat exchanger 331 and feed water heater 333 to produce stream 334 which is introduced to externally cooled condenser 335 where the major portion of the contained water will condense to produce a water oxygen mixture 336. Stream 336 is separated in separator 337 into oxygen, saturated with water, and oxygen 338 which optionally can be further cooled, compressed, dried and delivered as product 338A.

Water stream 339 discharged from separator 337 joins make-up water 340 and is recycled to the system. Combustion in boiler 347 is sustained by fuel stream 358 and air or oxygen stream 359 and produces flue gas waste stream 360.

The advantages of the embodiment represented in FIG. 3 are significant as Example 2 will show. The employment of a high pressure steam purge in the ion transport separator permits high oxygen recovery which is not limited by the oxygen partial pressure of the exiting retentate and as a result minimizes the amount of excess air that has to be processed in the complex system and therefore minimizes investment. The use of an ion transport reactor as a combined deoxo and combustor avoids contamination of the nitrogen co-product with products of combustion. Characteristics of ion transport reactors where oxygen reacts on the surface of the anode of the ion transport membrane permits effective combustion at low oxygen-fuel ratios and limits generation of NOX (nitrous oxides) since less or no nitrogen is present and the reaction takes place on the anode surface of the membrane which with proper heat transfer design can be maintained at temperatures substantially below typical flame temperatures of conventional combustors.

Splitting the retentate flow into a stream to be delivered at pressure and one to be expanded in such way that just sufficient power is generated to drive the air compressor provides for a simple, effective system since it avoids an additional machine to compress nitrogen to the desired product pressure. Use of a two-stage steam turbine expansion with reheat of the first stage exhaust and use of the intermediate pressure stream as the purge gas for the separator provides for an energy efficient Rankine cycle without need for designing the ion transport module for very high pressures. Normally a high pressure would be required for efficient energy production from a steam stream at the high temperatures at which ion transport systems have to operate.

System design is simplified by proportioning the operating variables of a system according to the present invention in such a way that most or all of the superheat required in the feed to the high pressure turbine, to prevent condensation during expansion, is provided by available sensible heat in the second low pressure stage exhaust. The combined system can produce oxygen, high purity nitrogen and co-generated power at very attractive fuel consumption, as illustrated by the following example.

EXAMPLE 2

Oxygen Product: 1000 MNCFH

Nitrogen Co-Product at 145 PSIA: 1670 MM NCFH

Air Compressor Discharge pressure 155 psia

Stages of Air Compression: 4 (a compressor driven by a hot gas expander rather than a gas turbine)

Air Compressor Efficiency: 85%

Hot Gas Turbine Inlet Pressure: 150 psia

Hot Gas turbine Inlet Temperature: 1750° F. (955° C.)

Hot Gas Turbine Exhaust Pressure: 16 psia

Hot Gas Turbine Efficiency: 90%

Ion Transport Separator Inlet

Temperature: 1650° F. (900° C.)

Ion Transport Deoxo Outlet Temperature: 1750° F.

Deoxo Fuel Dilution 79 MNCFH $N_2$

High Pressure Steam Turbine Inlet Pressure: 1000 psia

High Temperature Turbine Inlet

Temperature: 805° F. (430° C.)

Low Pressure Turbine Inlet Pressure: 150 psia

Low pressure Turbine Inlet Temperature: 1650° F.

Low Pressure Turbine Exhaust Pressure: 16 psia

Steam Turbine Efficiencies: 90%

Steam Condensing Pressure: 14.7 psia

Steam Generated: 303 M lbs/Hr

Results:

Oxygen Recovery: 83% of $O_2$ in Feed Air $N_2$ Co-Product at 145 psia: 1, 670 M NCFH Net Power Generated: 58,560 KW Heat Required: 490 MM BTU/Hr Heat Rate: 8370 BTU/KW Hr Heat Rate with Credit for $N_2$ Compr.: 7850 BTU/KW Hr H.R. with Credit for Sep.Pwr.(7KW/MNCFH): 7060 BTU/KW Hr Eff. Avg. $O_2$ Transport Driving Force: 0.308

Example 2 illustrates very attractive performance numbers for the embodiment of the invention as shown in FIG. 3. The use of a steam purge for the permeate side of the ion transport separator permits very high recovery of oxygen and therefore limits the amount of excess air that has to be processed by the system. Compared to Example 1, the amount of air is smaller by a factor of 3.1:1. The use of an ion transport reactor, which performs the deoxo function and at the same time generates the heat required for the air circuit, permits recovery of 90% of the nitrogen contained in the feed air at high product purity with a very simple cycle. Forty-one percent of the product nitrogen can be recovered at high pressure. The employment of a two-stage steam turbine cycle permits achieving very attractive energy utilization rates. The rates are significantly better than for the best case of Example 1 even though the former employs higher peak temperatures.

It should be noted that the cycles considered herein for illustration are Rankine and Brayton-Joule cycles, although the invention is not intended to be so limited. Thus, the embodiments of the invention discussed herein may be modified to incorporate other cycles known to those of skill in the art, for example, multiple reheat and regenerative cycles, dual pressure cycles, and cogeneration cycles, without departing from the spirit of the invention. Also it will be obvious to those skilled in the art that in practical applications that there be many opportunities to provide further integration of the Brayton and Rankine portions of the proposed embodiments especially with respect to optimum utilization of waste heat. Also it will be obvious to those skilled in the art that inlet conditions to various components can be varied to accommodate material considerations without departing from the intent of the invention, for instance cooling the purge stream exiting the ion transport membrane, prior to introduction to a steam turbine or cooling the separator or deoxo retentate prior to admission to a hot gas expander.

The processes of the invention can be driven partially by low-level heat and thus can be integrated with other processes that produce heat, including processes that utilize the product oxygen in producing the heat. When operated at a high feed pressure, the invention can be integrated with gas turbines or other devices for the production of power from the high pressure product or waste streams as shown in the examples. Typical ranges for operating parameters of the ion transport module are as follows:

Temperature: For the ion transport module, the temperature will typically be between 700° F. to 2000° F. (370 to 1100° C.) range, and preferably between 1000° F. and 1850° F. (535 to 1010° C.) range. The steam turbine will typically operate between 400 and 1700° F. range. The gas turbine will typically operate between 1300 and 2600° F.

Pressure: The purge-side pressure will typically be between 1 atm and 40 atm, and preferably between 1 atm and 12 atm. The feed-side pressure will be between 1 atm and 40 atm if pressurized nitrogen is needed as a product or if the ion transport exhaust gas goes to a gas turbine for power generation, and 1 atm to 10 atm otherwise. The feed-side and permeate side pressures may be made substantially equal to reduce sealing requirements between the sides of the membrane. Gas turbine inlet pressure will typically be between 5 atm and 40 atm, and the exhaust pressure will typically be between 1 atm and 1.5 atm. The steam generator will typically generate steam at a pressure of 3 atm to 80 atm for the Rankine cycle.

Oxygen Ion Conductivity of the Ion Transport Membrane: Typically in the 0.01–100 S/cm range (1 S=1/Ohm).

Thickness of the Ion Transport Membrane: Ion transport membrane can be employed in the form of a dense film, or a thin film supported on a porous substrate. The thickness (t) of the ion transport membrane/layer is typically less than 5000 microns, preferably it is less than 1000 microns, and most preferably it is less than 100 microns.

Configuration: The ion transport membrane elements may typically be tubular or planar.

If high purity (greater than 99.9%) nitrogen is to be produced, it may not be practical to carry out the separation using one ion transport module stage and postpurification may have to be used as in Example 2. For example, oxygen and low purity nitrogen can be produced in the ion transport stage and a postpurifier may be employed to remove most or all of the residual oxygen from the low purity nitrogen retentate from the ion transport module stage. The post purifier could be a traditional deoxo system (for example, one employing $H_2$-based deoxo), or preferentially another ion transport module as in Example 2.

If a second ion transport module stage is employed for postpurification, it may use a reactive purge gas, for example, methane, to purge the permeate side of the ion transport membrane. Such a reactive purge gas greatly reduces the partial pressure of oxygen on the purge side of the ion transport membrane, thereby effecting an enhanced oxygen transport and requiring a much smaller ion transport membrane area than if a nonreactive purge gas were used. A reactive purge gas may also provide all or part of the heat input necessary to maintain a high operating temperature in the ion transport module stage. It is also possible, although less desirable, to use a product purge scheme in the second ion transport module stage, whereby a part of the high purity nitrogen retentate gas stream is recycled to sweep the anode side of the ion transport module. The ion transport membrane area requirement in the product purge system is much higher than that in a reactively purged system.

The amount of oxygen separated in the ion transport module may easily be altered as desired by varying the feed gas stream pressure, the feed air flow rate, and/or the ion transport operating temperature. Although pressure-driven ion transport modules are preferred for the simplicity of their design, the ideas described herein are applicable to systems utilizing either an electrically-driven ion transport membrane or a pressure-driven ion transport membrane.

Figure 4:
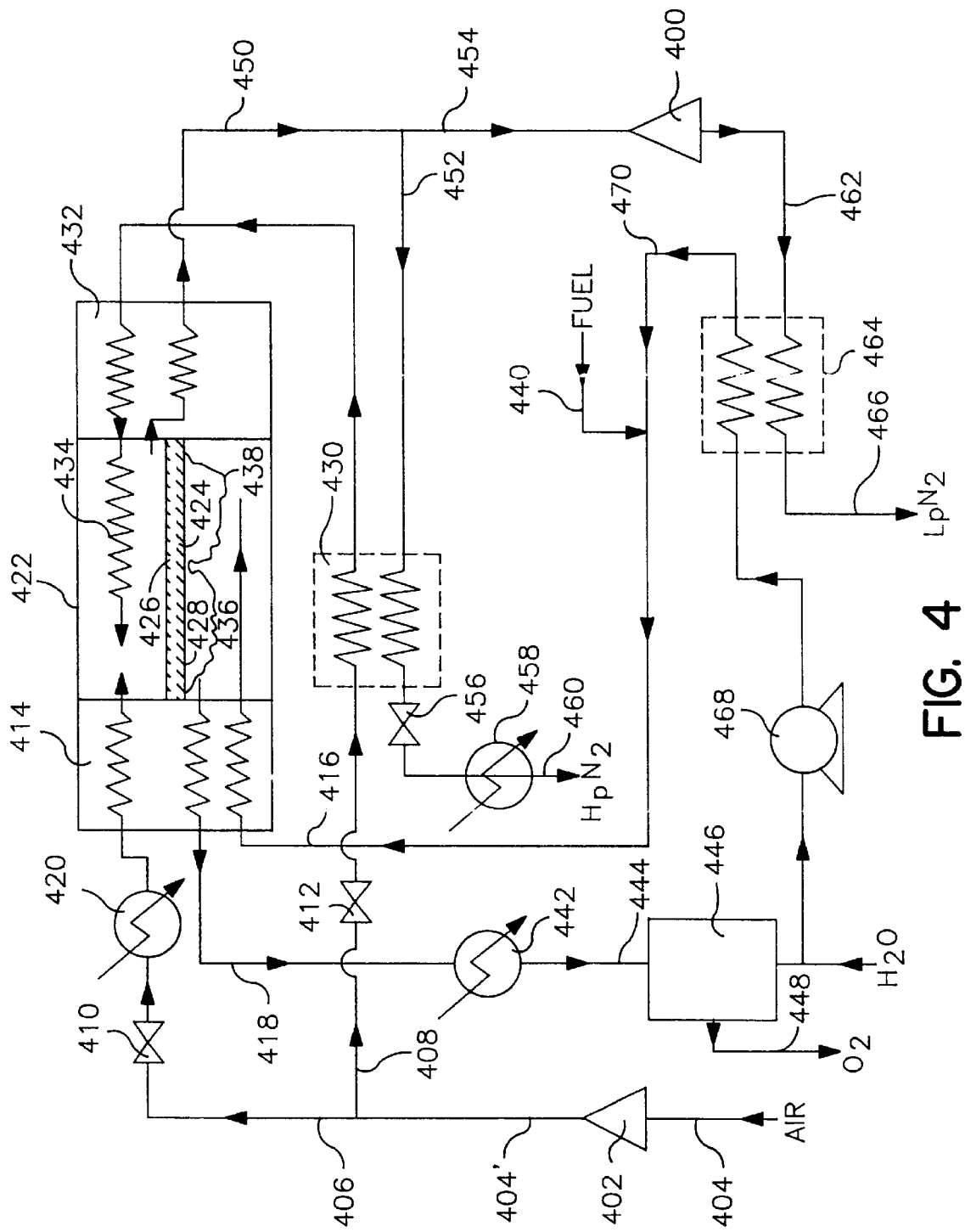
FIG. 4 is a schematic diagram of an embodiment of the invention illustrating an integrated system for the production of oxygen and nitrogen, that includes an oxygen selective ion transport membrane and a turbine.

In accordance with an embodiment of the invention illustrated in FIG. 4, the power produced by expanding stream 452, after it has been cooled to an intermediate temperature of 1100° to 1400° F. in, turbine 400 is approximately matched to the power required by air compressor 402. The result is a free-standing plant that produces both oxygen and nitrogen. The energy to drive the air compressor 402 is derived from heat generated in a deoxidation reaction and a relatively high recovery of oxygen from the air is realized with a modest air compression ratio. Since thermal rather than electrical energy drives the system and oxygen recovery is high, energy costs are low.

An oxygen-containing gas 404, is compressed by compressor 402. Preferably, compressor 402 is a two to four stage device, such as a three or four poster centrifugal machine where the individual turbine and compressor stage drive shafts engage a common gear transmission, that compresses the air to a pressure of between about 100 psia and 250 psia. Compressed oxygen containing gas stream 404' is divided into a first compressed portion 406 and a second compressed portion 408. Proportioning of the two portions 406, 408 is by regulating a first valve 410 and a second valve 412. The first and second valves 410, 412 may be of any construction effective to accurately control the flow rate of the respective compressed portion. The valves may be manually set during plant start-up and maintained at a constant flow rate or, alternatively, be incorporated into a feed back loop that monitors the temperatures of streams 418 and 450 and adjusts the valves by means, such as electromechanical ones, during plant operation to maintain these temperatures at the desired levels.

Proportioning of the first compressed portion 406 and second compressed portion 408 provides a sufficient volume of relatively cool gas to first heat exchanger 414 such that the combined heat capacity of the first compressed portion 406 and the fuel stream 416 is sufficient to cool oxygen product stream 418. Typically, the oxygen product stream 418 is cooled to a temperature of about 150° to 350° F. To enhance the heat capacity of the first compressed portion 406, an after-cooler 420 is optionally inserted upstream of the first heat exchanger 414.

"Upstream" is intended to convey its conventional meaning in the art, in a direction against the gas flow current. Gas flow current direction is indicated by arrow heads in the figures. "Downstream" is intended to convey its conventional meaning in the art, in a direction with the gas flow current.

Within the first heat exchanger 414, the first compressed portion 406 is heated to a temperature that is within about 50° to about 200° F. of the operating temperature of an oxygen transport membrane 422. Dependent on the material selected for membrane element 424, the operating temperature is typically in the range of about 1450° to about 2000° F.

Membrane element 424 has a cathode side 426 and an opposing anode side 428. On the cathode side 426, the pre-heated first compressed portion is recombined with second compressed portion 408 that has been pre-heated during transit through one or more of second heat exchanger 430, third heat exchanger 432 and internal heat exchanger 434.

Membrane element 424 has two sections, a separator section 436 and a reactor section 438. The two sections may be part of the same membrane element as illustrated in FIG. 4, or alternatively, comprise two separate membrane elements as described herein below with reference to FIG. 8. Alternatively the two membrane elements could be contained in two separate assemblies.

Referring back to FIG. 4, the recombined first compressed portion 406 and second compressed portion 408 contact the cathode side 426 of the membrane element 424 along the separator section 436. A portion (typically greater than 70% by volume) of the oxygen contained within the oxygen containing gas is transported through the membrane element 424 and recovered as oxygen product stream 418. A remainder of the oxygen contained within the combination of the first compressed portion 406 and second compressed portion 408 is transported through the membrane element 424 at the reactor section 438 and exothermically reacts with fuel 440 in an oxidation reaction to form primarily $CO_2$ and $H_2O$. The oxygen transported and reacted in reactor section is proportioned to generate sufficient heat to: (i) elevate the feed gas to oxygen transport membrane temperature, (ii) provide power for the compressing step, (iii) overcome energy losses in machinery, and (iv) compensate for heat losses to the environment and unrecovered heat from exiting streams. Typically, about 70% to 90%, by volume, of the oxygen contained within the combined first compressed portion 406 and second compressed portion 408 is transported in separator section 436 with substantially all of the remainder of the oxygen being transported within reactor section 438. The products of combustion generated in the deoxo section 438 are used to sweep the permeate side of separator section 436 thereby lowering the effective oxygen partial pressure in the separator and enhancing oxygen recovery or reducing separator oxygen transport membrane area.

Oxygen product stream 418 contains primarily oxygen, and combustion products from reactor section 438, primarily water and carbon dioxide. The oxygen product stream 418 is cooled in the first heat exchanger 414 transferring heat to incoming first compressed portion 406 and to fuel stream 416. A condenser 442 condenses most of the water from the oxygen product stream 418 producing as condenser output 444 a gas water mixture which is separated in separator 446 into liquid water and water saturated gas stream 448, containing, by volume, about 80% to 90% of oxygen and from about 10% to about 20% carbon dioxide. The oxygen output 448 is optionally, further processed downstream to remove contained water vapor and separate out and recover the carbon dioxide component.

The heat of reaction generated in the reactor section 438 is primarily absorbed by the temperature rise of the second compressed portion 408 in internal heat exchanger 434. Further heat is transferred to the cathode side retentate 450 and the oxygen product stream 418. Preferably, the rate of heat exchange is sufficiently high to maintain the temperature of the membrane element 424 within the range of 1450° F. to 2000° F.

The problems and solutions for temperature control of a membrane element in an oxygen transport membrane reactor are disclosed in commonly owned U.S. Pat. Nos. 5,820,654 and 5,820,655.

The cathode side retentate 450 is an oxygen depleted gas, primarily nitrogen. It is cooled in third heat exchanger 432 to a temperature sufficiently low to permit use of 17-4 Ph stainless steel or similar standard materials in turbine 400, but still sufficiently high to be able to drive air compressor 402 by expanding only a portion (60 to 80%) of stream 450. The cathode side retentate is preferably cooled to a temperature below about 1400° F. and above 1100° F. and most preferably to a temperature of about 1300° F.

Cathode side retentate 450 is divided into a first oxygen depleted portion 452 and a second oxygen depleted portion 454. The split of flow 450 into streams 452 and 454 is adjusted by controlling valve 456 to yield a match between turbine power output and compressor power demand. Third valve 456 may be either manually preset or contain a feed back loop and be continuously adjusted dependent on the output requirements imposed on turbine 400.

The first oxygen depleted portion 452 is cooled in second heat exchanger 430 with the heat being transferred to the second compressed portion 408. Further cooling may be provided by after cooler 458 generating a product gas stream 460 of pressurized nitrogen. Typically, the nitrogen is at a pressure of about 5 to 30 psi below compressor 402 discharge pressure.

The second oxygen depleted portion 454 is expanded in turbine 400 to produce an amount of work required to drive air compressor 402. The turbine exhaust 462 contains a significant amount of heat that may be recovered in a fourth heat exchanger 464. The cooled turbine exhaust is then recovered as a low pressure nitrogen gas stream 466. Typically, the low pressure nitrogen gas stream 466 is released at or near atmospheric pressure. Optionally the heat recovered from turbine exhaust stream 462 can be used to raise steam 470 in boiler 464. The steam, typically at low to medium pressure (15 to 65 psia) can be mixed with fuel 440 and used as additional sweep gas for purging the permeate sides of reactor 438 and separator 436.

Water recovered from separator 446 may be pumped 468 through the fourth heat exchanger 464, for example a boiler, and converted to steam 470. The amount of steam 470 raised generally depends on the heat available in exhaust stream 462. Optionally additional steam can be generated by a second boiler heated by reacting fuel and oxygen from an ambient pressure air supply. Further, the addition of steam to the anode side 428 of the oxygen transport membrane 422 reduces the oxygen partial pressure on the anode side increasing the driving force of the transfer of oxygen from the cathode side 426 to the anode side 428.

In a typical application, a purge stream, comprising a mixture of combustion product gases and steam on the anode side 428 enables an about 84% recovery of oxygen from the combination of first compressed portion 406 and second compressed portion 408 at a cathode side pressure of 115 psia while maintaining an average ratio of oxygen partial pressures of about 2 between the cathode side and the anode side in the separator section 436.

Figure 5:
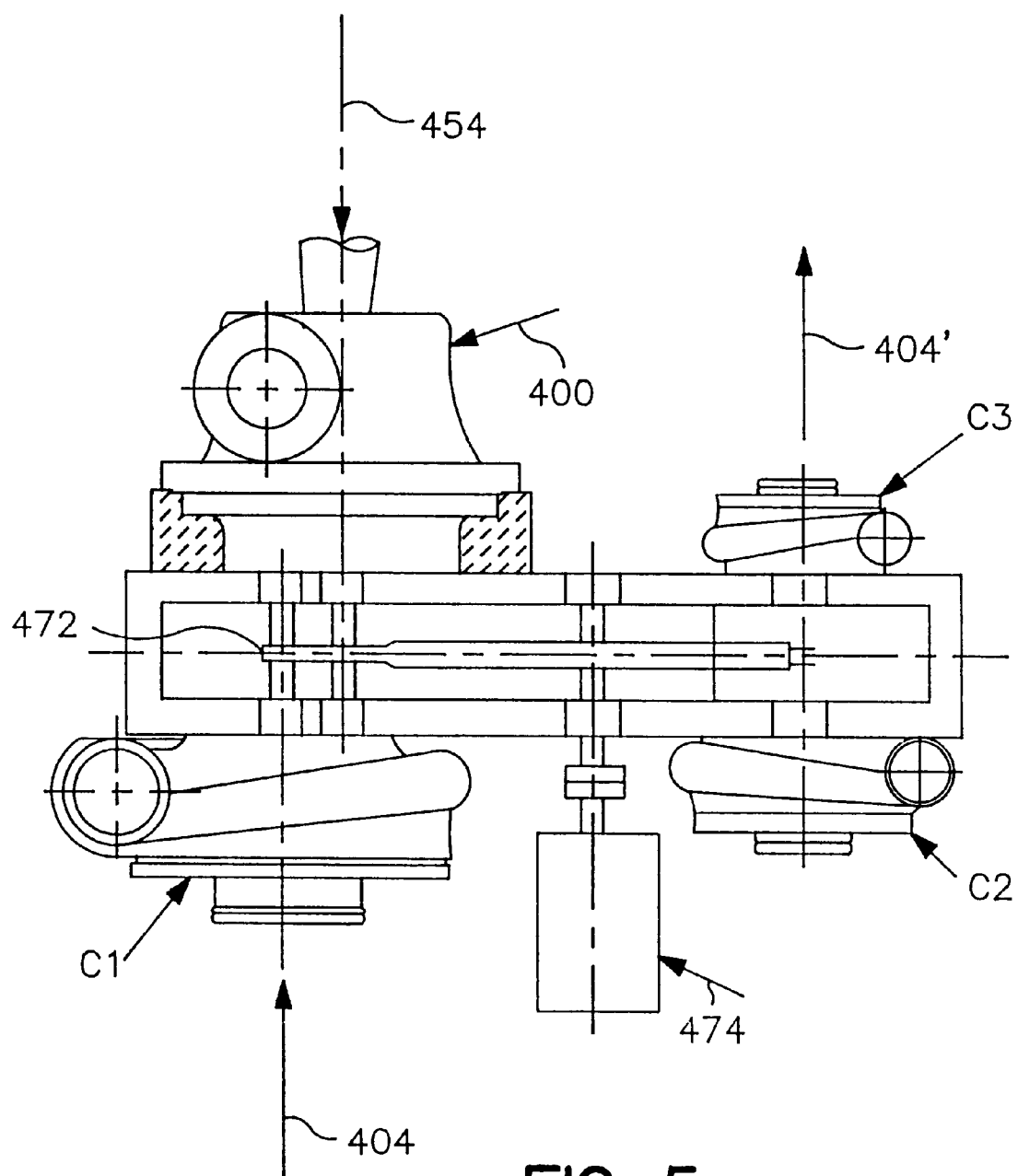
FIG. 5 illustrates a turbine/three stage compressor assembly useful in selected embodiments of the invention.

An exemplary turbine/compressor arrangement is illustrated in FIG. 5. Turbine 400 drives a common transmission gear 472 by expansion of second oxygen depleted portion 454. The common transmission gear drives three compression stages C1, C2 and C3 that work in series to compress the oxygen-containing gas 404 to compressed oxygen-containing gas 404'. An optional motor 474 is connected to the common transmission gear 472 to provide power in the system start-up mode and also to supply supplementary power, if required. Intercoolers (not shown) could be provided between stages for improved efficiency.

Figure 6:
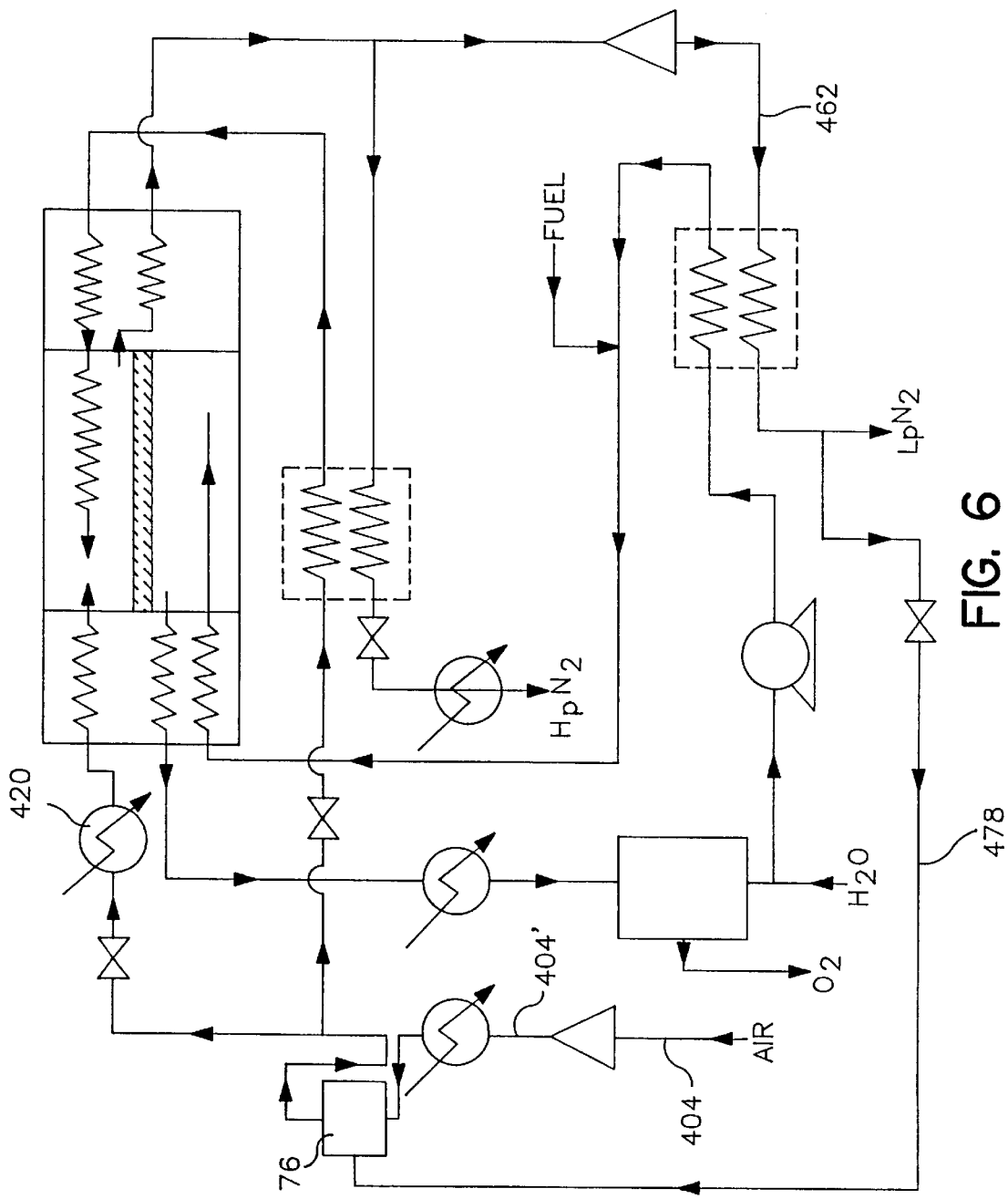
FIG. 6 is a schematic diagram of an embodiment of the invention similar to FIG. 4 that further includes utilizing turbine exhaust products to regenerate an adsorbent bed contained within a pre-purifier.

FIG. 6 schematically illustrates a further refinement of the embodiment illustrated in FIG. 4. With reference to FIG. 6, compressed oxygen-containing gas 404' is processed in a multibed pressure swing adsorption prepurifier 476 that contains adsorbent beds formed from layers of activated alumina and zeolite molecular sieve pellets or beads to remove water, carbon dioxide, heavier hydrocarbons and other gaseous air contaminants from the compressed oxygen-containing gas. If prepurifier 476 is included in the flow stream, an aftercooler is inserted between compressor 402 and prepurifier 476 to increase the capacity of the adsorbents of prepurifier 476. The compressed oxygen-containing gas 404' is sufficiently cool so that after cooler 420 may be omitted.

Figure 7:
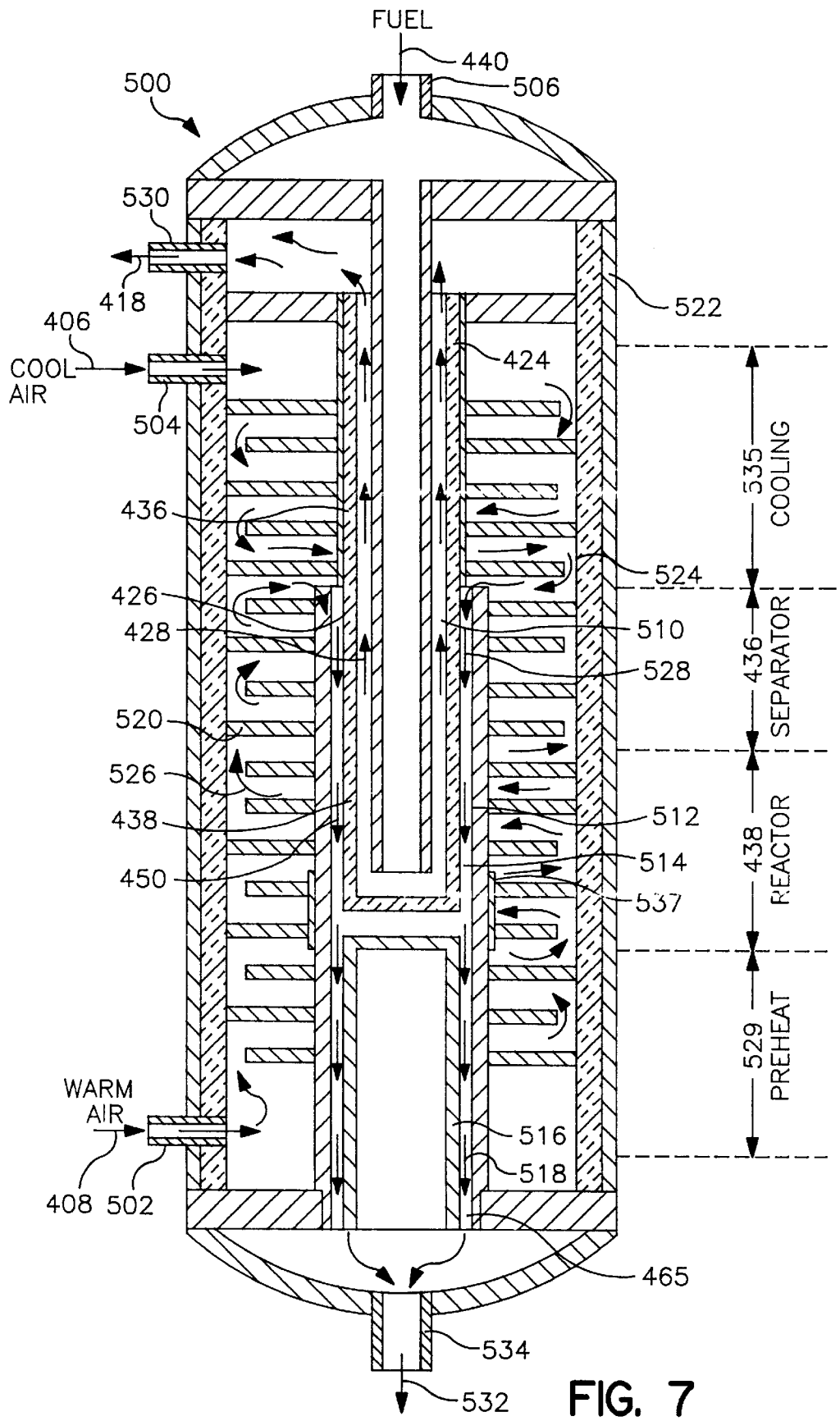
FIG. 7 illustrates in cross-sectional representation a first reactor useful for the production of oxygen and nitrogen in accordance with embodiments of the invention.

When adsorption prepurifier 476 is employed, from a portion to all of the turbine exhaust 462 may be delivered 478 to the adsorption prepurifier for regeneration of the adsorbent beds of the adsorbent prepurifier. The volume of turbine exhaust 462 that can be delivered 478 to the adsorption prepurifier 476 is equal to about 60% of the volume of the incoming oxygen-containing gas 404. This corresponds to a cleaning ratio of (volume of turbine exhaust/volume of air)=4.3 that is adequate for operating the adsorption beds of a simple pressure swing cycle. FIG. 7 illustrates in cross-sectional representation a reactor 500 useful for the production of oxygen and nitrogen in accordance with embodiments of the invention. A number of the features of the reactor 500 are described in U.S. Pat. Nos. 5,820,654 and 5,820,655 incorporated by reference in their entirety herein.

Inlet 504 delivers first compressed portion 406 of an oxygen-containing gas, that is typically air. Inlet 502 delivers second compressed portion 408 of the oxygen-containing gas. After traversing the preheat section, stream 408 becomes preheated stream 526. Fuel 440 and optionally steam is introduced to the reactor through feed tube 506. The reactor contains a preheat section 529, a reactor section 438, a separator section 436 and a cooling section 535. Circumscribing at least a portion of the feed tube 506 is a tubular membrane element 424. Preferably membrane element 424 is comprised of a porous ceramic or metallic substrate which supports a thin dense coating. The coating in reactor section 438 and separator section 436 may be any material effective for the selective transport of oxygen. Most preferable in the reactor section is a chromium containing perovskite coating, as for example, one of the materials specified in row 9 of Table 1, and in the separator section a coating made from a high conductivity mixed conductor such as item 1 of Table 1 above. An impervious coating 508, such as nickel, preferably coats a portion of the membrane element 424 adjacent to its open end in cooling section 535 so that oxygen transport only occurs in the separator section 436 and in the reactor section 438. A transition porous layer is required between the porous support and the coating to bridge chemical and mechanical compatibility problems between the coating and the substrate.

The outside diameter of the feed tube 506 and the inside diameter of the membrane element 424 define a first annulus 510. A gas impervious shroud tube 512 surrounds a portion of the membrane element 424. The outside diameter of the membrane element 424 and the inside diameter of the shroud tube 512 define a second annulus 514. A dummy tube 516 extends within the shroud tube 512 along a portion removed from the membrane element 424. The outside diameter of the dummy tube 516 and the inside diameter of the shroud tube 512 define a third annulus 518. Each of the respective first, second and third annuli 510, 514, 518 are sized to enhance convective heat transfer. Typically, each annulus has a width of less than about ⅛ inch.

A plurality of baffles 520 further improve heat transfer on the shell side. While FIG. 7 illustrates the baffles as uniformly spaced, typically, the baffle spacing would be greater adjacent to the inlet 502 than the inlet 504. This is because the second compressed portion 408 is generally of greater volume and somewhat warmer than the first compressed portion 406. In the reactor section 438 baffle spacing would be large at the cooler end and small at the hot end of the section to attain low overall heat transfer coefficients where the temperature difference between membrane and shell side gas is large and high coefficients where the temperature difference is small. Near the entrance to the section insulation sleeves 537 that are about ¹⁄₃₂ to ⅛ inch thick may have to be added to the outside of the shroud tube to avoid depression of the membrane temperatures below its operating range.

The reactor 500 is generally formed of a metallic shell 522 and has a layer of insulation 524 formed on the inside surfaces of the metallic shell.

When the reactor is operated, the second compressed portion 408 enters interior enclosure of metallic shell 522 through the inlet 502. While traversing the preheat section baffles 520, the second compressed portion gas stream recovers heat from heated nitrogen retentate stream 465 contained within third annulus 518. While flowing through the shell side of the reaction section 438 second portion compressed gas stream absorbs the major share of heat generated by the oxygen-fuel reaction in annulus 428 and in the process its temperature is elevated to near membrane operating temperature. Prior to entering second annulus 514, the first compressed portion is recombined with the second compressed portion 408. First compressed stream 406 was introduced at nozzle 504 and heated in cooling section 535 to near membrane operating temperature. The recombined, now hot, oxygen-containing stream 528 enters annulus 514 and within separator section 436 transfers the major portion of contained oxygen from cathode side 426 to anode side 428 of the membrane element 424 by ion transport. After traversing the separator section it enters reactor section 438 where nearly all or at least the greater portion of the residual oxygen contained in the stream is transported to the anode to react exothermically with fuel 440 within reactor section 438. Since the permeate flow is countercurrent to the retentate flow the resulting combustion products are effective as a purge stream for the anode side of the membrane element 424 in the separator section 436, thereby enhancing the transfer of oxygen.

The exiting oxygen product stream 418 consists primarily of oxygen, water and carbon dioxide and is cooled against the incoming first compressed portion 406 and leaves the reactor 500 through outlet 530. Nitrogen-rich cathode side retentate 450 exits the reactor as nitrogen product gas 532 through outlet 534.

Heat transfer within the reactor 500, in combination with insulation layer 524 assures that all structural elements, such as tube sheets and shells are at moderate temperatures to allow the use of ordinary engineering materials such as stainless steel and carbon steel and also facilitates the manufacture of tube to tube sheet joints. Each tube has one unrestrained, free floating end, thereby avoiding stresses from differential thermal and compositional expansions and contractions.

Figure 8:
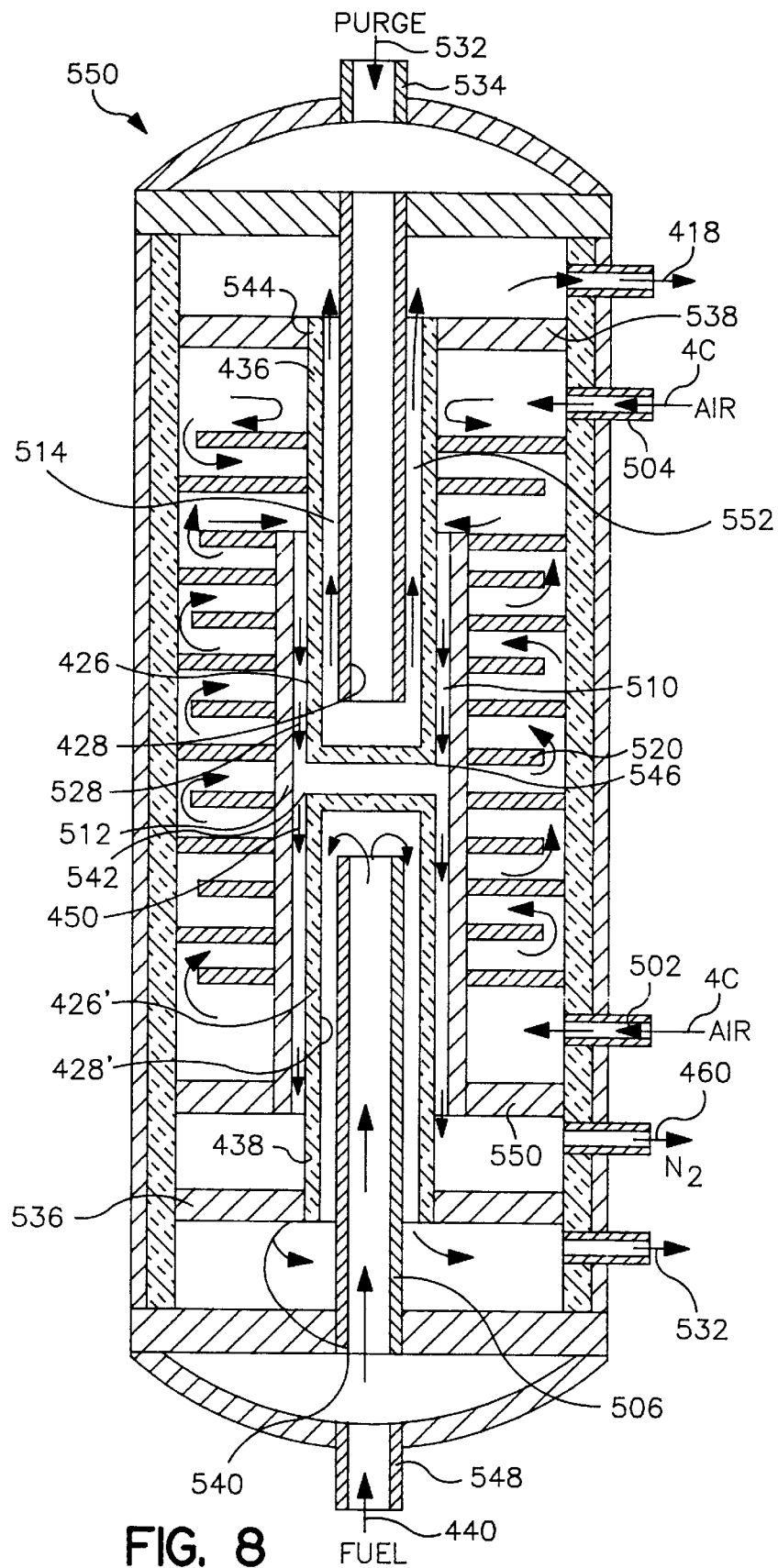
FIG. 8 illustrates in cross-sectional representation a second reactor useful for the production of nitrogen and oxygen in accordance with embodiments of the invention.

FIG. 8 illustrates in cross-sectional representation an alternative reactor 550. The reactor 550 has two separated membrane elements, separator section 436 and reactor section 438. This reactor configuration enables co-current flow of retentate and permeate in the reactor section 438 but retains counter-current flow between retentate and permeate in the separator section to take full advantage of the permeate side purge. Co-current flow in the reactor section can have an advantage in that it produces lower compositional stresses in the membrane element.

The reactor 550 has a hollow metallic shell defining a hermetic enclosure. A first tube sheet 536 and a second tube sheet 538 are disposed within the hermetic enclosure a spaced distance apart. A first reaction tube comprising reactor section 438 has an inner (anode) surface 428' and an outer (cathode) surface 426'. An open first end 540 of the first reaction tube is affixed to the first tube sheet 536 and a second, closed end 542, extends into the spaced distance. Typically, only a portion of the first reaction tube is effective as an oxygen selective ion transport membrane. The tube ends are typically coated with an impervious barrier layer since the primary function of these sections is heat transfer.

A second reaction tube comprising separator section 436 has an inner (anode) surface 428 and an outer (cathode) surface 426. An open, first, end 544 of the second reaction tube is affixed to the second tube sheet 538 and a second, closed, end 546 extends into the spaced distance. As with the first reaction tube, typically only a portion of said second reaction tube is effective as an oxygen selective ion transport membrane.

Shroud tube 512 circumscribes at least a portion of the first and second reaction tubes, including portions of both oxygen selective ion transport membranes. A combination of an inner surface of the shroud tube and an outer surface of the oxygen selective ion transport membranes defining an annulus 514.

A plurality of oxygen containing gas inlets 502, 504 deliver oxygen containing feed gas to the annulus 514. A third tube sheet 550 is disposed between the first tube sheet 536 and the second tube sheet 538. The shroud tube extends through both the separator section and the reactor section thereby placing the two sections in series on the retentate side. Flow on the annuli between inner feed tube outer diameters and membrane tube inner diameters, which define the anodes, can be in either direction. Therefore the design permits freedom in selecting the flow of retentate and permeate in the reactor section to be either co-current or counter-current. As with reactor 500 reactor 550 also contains preheat and cooling sections as well as reactor and separator sections. Gas stream 408 first traverses the baffled preheat section being partially warmed by exiting nitrogen product, then absorbs the heat of reaction while flowing through the baffled shell side of the reactor section and is then combined with stream 406, which had been warmed by exiting product gas stream 418 prior to entry into retentate flow annulus 514. A fuel gas inlet 548 delivers fuel gas 440 through feed tube 506 to inner surface 428' of the reactor section 438. The fuel gas is introduced to the reactor section at a location that is adjacent to the closed end 542 and flows co-current to said oxygen containing gas in said annulus 510. Outlets are provided for the removal of oxygen product gas 418 and nitrogen product gas 460 as well as combustion products 532. Combustion products 532 may be utilized to purge the separator section 436 by introduction through purge tube 552. The purge tube 552 extends into the separator section such that combustion products are introduced adjacent to the closed end 546 and flow is countercurrent to the oxygen containing gas in said annulus 510.

In operation of reactor 550, first compressed portion 406 of an oxygen-containing gas, typically air, is introduced into the reactor shell and warmed against leaving hot oxygen product stream while traversing baffles 520. Second compressed portion 408 is heated by leaving nitrogen product in the preheat section, then absorbs the heat of reaction in the reactor section and, now hot, is combined with the first compressed portion 406. As the hot combined stream 528 traverses the cathode side 426 of separator section 436, a portion of the oxygen is transported to anode side 428 and recovered as oxygen product stream 418. To reduce the oxygen partial pressure on the anode side 428 and thereby increase the oxygen transport through the separator section 436 of the membrane element, a purge gas 532 is introduced through purge tube 534. One suitable purge gas 532 is the combustion products from the reactor section 438.

Cathode side retentate 450 flows along the cathode side 426' of the reactor section 438 membrane element and the remaining oxygen is transported to the anode side 428' for reaction with fuel 440. Nitrogen product gas 460 is recovered from the reactor shell and combustion products 532 are either discharged or delivered to purge inlet 534.

FIGS. 5 and 6 show only a single membrane tube arrangement for clarity. It will be apparent to those skilled in the art that the shown configurations are also representative for multitube assemblies.

In all of the preceding embodiments, higher air feed pressures than disclosed in the examples increase the work potential of the nitrogen retentate stream permitting a reduction in turbine flow and higher nitrogen recovery at a greater elevated pressure. The heat available for raising purge steam would decrease. However, since the cathode pressure would be higher, the effect on oxygen recovery and separator area would be small. Raising the turbine inlet temperature would also raise the work potential of the turbine, especially at higher cathode side pressures, but at the expense of requiring use of higher temperature materials for manufacturing the turbine.

While the embodiments of the invention include an external steam purge, the invention is equally applicable to systems without an external steam purge. When the external steam purge is omitted, there is a lower oxygen recovery and or the requirement of increased separator area.

EXAMPLE 3

Following is an example obtained by modeling a case employing the flow sheet of FIG. 4 and the reactor design of FIG. 5 with the assumptions listed below Air Flow: 1130 MNCFH.

Air Compression to 115 psia in 3 stages with an adiabatic efficiency of 85%.

Air flow into reactor separator cooler:
225 MNCFH at 120° F.
905 MNCFH at 400° F.

Max oxygen transport membrane (OTM) operating temperature:
1760° F.

Avg. OTM separator driving force:
$\log(PO_{cathode}/PO_{anode})=0.3$

Nitrogen flow leaving separator reactor cooler at 1300° F.

Turbine Flow: 680 NCFH of $N_2$ at 1300° F.

Turbine efficiency: 85%.

Purge steam raised: 4.21 lbs/hr.

Fuel: Natural Gas with lower heating value of 900 BTU/NCFH

Fuel consumption: 18900 NCFH

Product flow:
200 MNCFH $O_2$ contained (91.4% $O_2$, 8.6% $CO_2$) at 15 psia.
212 MNCFH $N_2$ ($O_2$<10 ppm) at 100 psia.

Oxygen recovery: 84.3% of theoretical total.

KW for air compression—credit for product nitrogen compression: 10.03/MNCFH $O_2$ Cost of air compression—for separation at $2/MNCFH natural gas: 0.156 $/1000 NCFH $O_2$ In the above example energy recovery from hot streams was limited to keep cold end temperature differentials large and heat exchanger capital cost low. Increasing heat recovery could reduce gas consumption by as much as 10%. Nevertheless, the energy cost for separation and nitrogen cost is low, compared to competing cryogenic and non-cryogenic processes which typically consume about 8 KW/1000 NCFH $O_2$ for separation at 0.035 $/KW HR or 0.280 $/1000 MNCFH $O_2$.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

We claim:

1. A low energy cost process for the production of oxygen and nitrogen from a feed gas containing a mixture of oxygen and nitrogen that comprises the steps of:

compressing said feed gas in an air compressor to produce a compressed feed gas;

contacting said compressed feed gas with a cathode side of an oxygen selective ion transport membrane, said feed gas being at a first temperature that is effective to promote pressure driven transport of elemental oxygen from said cathode side to an anode side of said oxygen selective ion transport membrane after which a retentate containing nitrogen rich product gas remains on said cathode side;

dividing said retentate into a first oxygen depleted portion at a first flow rate and a second oxygen depleted portion at a second flow rate;

recovering a high pressure nitrogen rich product gas from said first oxygen depleted portion;

expanding said second oxygen depleted portion in a turbine thereby generating a combination of work and a turbine exhaust of a low pressure nitrogen rich product gas whereby, in said dividing step, said first flow rate is selected to enable said turbine to provide sufficient work to drive said compressor; and recovering oxygen product gas from a permeate on said anode side of said oxygen selective ion transport membrane.

2. The process of claim 1 wherein said feed gas sequentially contacts first a separator section of said oxygen selective ion transport membrane and then a reactor section and wherein a majority of elemental oxygen contained within said feed gas is transported through said separator section and substantially the remainder of said elemental oxygen is transported through said reactor section.

3. The process of claim 2 including the further step of combusting a fuel with transported elemental oxygen in said reactor section to form a mixture of carbon dioxide, steam and heat energy.

4. The process of claim 3 wherein said heat energy is essentially equal to the net energy required to: (i) elevate the feed gas to oxygen transport membrane operating temperature, (ii) perform said compressing step, (iii) overcome energy losses in machinery and (iv) compensate for heat leak to the environment and unrecovered heat from exiting gaseous streams.

5. The process of claim 4 wherein the anode sides of said separator section and said reactor sections are arranged in series with combustion products from said reactor section sweeping the anode side of said separator section countercurrently to the direction of feed gas flow, thereby producing a separator section anode side gaseous stream consisting essentially of carbon dioxide, steam and oxygen.

6. The process of claim 5 wherein oxygen product gas is recovered from said separator section anode side gaseous stream by condensing out water and separating $CO_2$ in a downstream operation.

7. The process of claim 5 including the step of utilizing heat energy recovered in recuperative heat exchangers to preheat both said feed gas and said fuel prior to entering said oxygen selective ion transport membrane.

8. The process of claim 7 wherein said feed gas is divided into two compressed portions with a first compressed portion and said fuel cooling said separator section anode side gaseous stream and a second compressed portion absorbing heat of reaction in said reactor section cathode side thereby maintaining said oxygen selective ion transport membrane at a temperature of below 2000° F. and, further, cooling at least partially said retentate gas stream exiting the cathode side of said reactor section.

9. The process of claim 8 wherein the first product gas stream is cooled to an intermediate temperature of between 1100° and 1400° F. before being expanded in said turbine.

10. The process of claim 9 wherein said turbine drives said air compressor, the air compressor having at least three stages.

11. The process of claim 10 wherein said turbine and said air compressor form a four poster arrangement with the shafts of the three air compressor stages and the turbine engaging a common gear transmission.

12. The process of claim 7 where the oxygen selective ion transport membrane are integral with heat exchange surfaces of said recuperative heat exchangers, where porous substrates support an impermeable seal coat in said recuperative heat exchangers, the separator area has a high conductivity ion transport membrane, and the reactor area has an ion transport membrane made from a material having high stability at low oxygen partial pressures.

13. The process of claim 5 wherein said separator section and said reactor section are combined in a single unit.

14. The process of claim 4 where heat energy recovered from an exhaust stream of said turbine is used to generate steam, said steam being used to purge the anode side of at least one of said separator section and said reactor section.

15. The process of claim 14 wherein said fuel is mixed with said steam and used to purge the anode side of said reactor section.

16. The process of claim 14 where at least a portion of said turbine exhaust is used to regenerate the beds of an adsorption prepurifier that removes water, carbon dioxide, heavier hydrocarbons and other gaseous air contaminants from said feed gas downstream from said air compressor.

17. The process of claim 2 wherein in said reactor section, gaseous flow on said anode side is co-current with gaseous flow on said cathode side.

18. A reactor comprising:

a hollow shell defining a hermetic enclosure;

a first tube sheet disposed within said hermetic enclosure;

a second tube sheet disposed within said hermetic enclosure a spaced distance from said first tube sheet;

a first reaction tube having an inner surface and an outer surface and a first open end affixed to said first tube sheet and a second closed end extending into said spaced distance, a portion of said first reaction tube that is disposed between said first end and said second end being a first oxygen selective ion transport membrane with said inner surface constituting a first anode side and an outer surface constituting a first cathode side;

a second reaction tube having an inner surface and an outer surface and a first open end affixed to said second tube sheet and a second closed end extending into said spaced distance, a portion of said second reaction tube that is disposed between said first end and said second end being a second oxygen selective ion transport membrane with said inner surface constituting a second anode side and an outer surface constituting a second cathode side;

a shroud tube circumscribing at least a portion of both said first oxygen selective ion transport membrane and said second oxygen selective ion transport membrane, a combination of an inner surface of said shroud tube and an outer surface of both said first oxygen selective ion transport membrane and said second oxygen selective ion transport membrane defining an annulus;

a plurality of oxygen containing gas inlets for the delivery of an oxygen containing gas to said annulus;

a fuel gas inlet for delivery of a fuel gas to said inner surface of said first oxygen selective ion transport membrane; and a plurality of outlets for the removal of a product gas and reaction by-product gases from said hermetic enclosure.

19. The reactor of claim 18 wherein a third tube sheet is disposed between said first tube sheet and said second tube sheet and said plurality of oxygen containing gas inlets are disposed between said second tube sheet and said third tube sheet, a fuel tube extending into said first oxygen selective ion transport membrane and said fuel is introduced through said fuel tube adjacent to said closed end and flows co-current to said oxygen containing gas in said annulus.

20. The reactor of claim 19 wherein elemental oxygen within said oxygen containing gas in said annulus is transported from said first cathode side to said first anode side and combusted with said fuel thereby forming combustion products.

21. The reactor of claim 19 wherein a purge tube extends into said second oxygen selective ion transport membrane and said combustion products are introduced through said purge tube adjacent to said closed end and flow countercurrent to said oxygen containing gas in said annulus.

* * * * *